United States Patent
Yang

(10) Patent No.: US 12,470,410 B2
(45) Date of Patent: Nov. 11, 2025

(54) METHOD OF AUTHENTICATION BETWEEN ELECTRONIC DEVICES

(71) Applicant: Fu Jian Fa Ba Wang Information Technology Company Limited, Fuzhou (CN)

(72) Inventor: Tien-Li Yang, Taipei (CN)

(73) Assignee: Fu Jian Fa Ba Wang Information Technology Company Limited, Taipei (TW)

( * ) Notice: Subject to any disclaimer, the term of this patent is extended or adjusted under 35 U.S.C. 154(b) by 0 days.

(21) Appl. No.: 18/654,229

(22) Filed: May 3, 2024

(65) Prior Publication Data

US 2024/0323036 A1    Sep. 26, 2024

Related U.S. Application Data

(63) Continuation of application No. PCT/CN2023/092228, filed on May 5, 2023.

(30) Foreign Application Priority Data

Aug. 31, 2022   (CN) .......................... 202211055110.9

(51) Int. Cl.
*H04L 9/32* (2006.01)
*H04L 9/30* (2006.01)

(52) U.S. Cl.
CPC .............. *H04L 9/3273* (2013.01); *H04L 9/30* (2013.01); *H04L 9/3226* (2013.01)

(58) Field of Classification Search
CPC ........ H04L 9/3273; H04L 9/30; H04L 9/3226
(Continued)

(56) References Cited

U.S. PATENT DOCUMENTS

| | | | |
|---|---|---|---|
| 2005/0094808 A1* | 5/2005 | Pedlow, Jr. ...... | H04N 21/23476 348/E7.056 |
| 2012/0082312 A1 | 4/2012 | Liu et al. | |

(Continued)

FOREIGN PATENT DOCUMENTS

| | | |
|---|---|---|
| CN | 1846397 A | 10/2006 |
| CN | 113615220 A | 11/2021 |

(Continued)

OTHER PUBLICATIONS

International Search Report in International Application No. PCT/CN2023092228, mailed Aug. 4, 2023, 3 pages.

(Continued)

*Primary Examiner* — Moeen Khan
(74) *Attorney, Agent, or Firm* — Volpe Koenig

(57) ABSTRACT

This disclosure relates to a first electronic device, a remote electronic device, a method of authentication between electronic devices. The method is applicable in a mutual dynamic authentication, and the method includes: initiating, by a first electronic device, registration with a remote electronic device for registering an identity belonging to the first electronic device with the remote electronic device, by: calculating a second cryptographic authentication code; and securing first information and second information from being tampered with by a middleman; wherein the first information is sent by the first electronic device to the remote electronic device, and includes a first public key and a second public key of the first electronic device; and wherein the second information is received from the remote electronic device, and the second information includes a first public key and a second public key of the remote electronic device.

17 Claims, 9 Drawing Sheets

(58) Field of Classification Search
USPC .......................................................... 713/169
See application file for complete search history.

(56) References Cited

U.S. PATENT DOCUMENTS

| | | | |
|---|---|---|---|
| 2015/0113266 A1* | 4/2015 | Wooten | H04L 9/3234 713/155 |
| 2016/0087797 A1 | 3/2016 | Barbir et al. | |
| 2016/0315772 A1* | 10/2016 | McCallum | H04L 9/3033 |
| 2020/0344052 A1* | 10/2020 | Fay | H04L 9/0844 |
| 2020/0403780 A1* | 12/2020 | Ståhl | H04L 63/062 |
| 2021/0328779 A1* | 10/2021 | Ruan | H04L 9/0825 |
| 2023/0361994 A1* | 11/2023 | Nix | H04L 9/0618 |

FOREIGN PATENT DOCUMENTS

| | | |
|---|---|---|
| CN | 117675249 A | 3/2024 |
| WO | 2024045677 A1 | 5/2023 |

OTHER PUBLICATIONS

Ku, Wei-Chi, et al. "An Enhanced Verifier-Free Remote User Password Authentication Scheme", IEEE International Conference on e-Business Engineering, Dec. 31, 2007.

Liu, Yanmin, et al., "Mutual Authentication and Key Exchange Scheme Based on SRP Protocol" Computer Engineering, Aug. 31, 2004.

Wu, Thomas, "The Secure Remote Password Protocol", Internet Society Network and Distributed Systems Security Symposium (NDSS), Mar. 13, 1998.

Anonymous, "The Group Structure of Supersingular Curves", Rutgers University School of Arts & Sciences: Mathematics Department, 9 pages.

Bourdez. D. et al., "The Opaque Asymmetric Pake Protocol", IETF Trust, 2022, 51 pages.

Charles, D., "On the Existence of Distortion Maps on Ordinary Elliptic Curves", published Aug. 15, 2006; retreived online on May 14, 2025 at https://core.ac.uk/download/579876271.pdf; 3 pgs.

* cited by examiner

METHOD OF AUTHENTICATION BETWEEN ELECTRONIC DEVICES

CROSS-REFERENCE TO RELATED APPLICATIONS

The present disclosure is a continuation application of International Application No. PCT/CN2023/092228, filed on May 5, 2023, which is based upon and claims priority to Chinese Patent Application No. 202211055110.9, filed on Aug. 31, 2022, both of which are incorporated by reference herein in their entireties for all purposes.

TECHNOLOGY FIELD

The disclosure involves a first electronic device, a remote electronic device, a method of authentication between electronic devices. In particular, it involves a first electronic device, a remote electronic device, and a method of authentication between electronic devices in which impersonation is not possible even if an attacker has a cryptographic authentication code.

BACKGROUND

In an information transmission, the conditions that a first electronic device and a remote electronic device may establish a secure channel are to authenticate an identity of information source, and use information encryption, to ascertain an identity of an information receiver. A mechanism of public key infrastructure by a pre-shared mutually trusted third party verifies that the other party's public key. That method presupposes that a mutually trusted third party may be able to impersonate. For mitigating impersonation risks resulted from a pre-shared mutually trusted third party, there is a method of a direct identity authentication using cryptographic authenticated key exchange. Using a cryptographic authentication code to proceed to an augmented cryptographic authenticated key exchange is a method of a direct identity authentication. The technology of Secure Remote Password (SRP) supports a direct identity authentication. In addition, in another embodiment, the technology of SRP transmits a cryptographic authentication code offline. Using a cryptographic authentication code to authenticate an identity includes an advantage that a method, that using a different cryptographic authentication code to authenticate a different identity, and that using an offline transmission of a cryptographic authentication code mitigates leakage of a cryptographic authentication code.

SUMMARY

The disclosure tries to solve a technical problem. Direct to insufficiency of a current technology, it provides a method of an authentication in a remote electronic device, wherein, the remote electronic device receives registration information from a first electronic device initiating a registration, a method of said registration including: the remote electronic device receiving first information (w1) from the first electronic device, wherein, the first information (w1) includes a first public key (A1) and a second public key (A2); the remote electronic device generating a temporary private key (b); the remote electronic device calculating, based on the temporary private key (b), a temporary public key, the temporary public key serving as a first public key (B1); the remote electronic device generating a cross-stage secret key (y); the remote electronic device using the second public key (A2) to calculate a one-way function of the cross-stage secret key (y), the one-way function of the cross-stage secret key (y) serving as a second public key (B2); the remote electronic device transmitting, based on the first information (w1), second information (w2) to the first electronic device, wherein, the second information (w2) includes the first public key (B1) and the second public key (B2); the first electronic device calculating a common secret key (e), wherein, the common secret key (e) is determined based on a first cryptographic authentication code (v1), the first public key (A1), and the temporary private key (b). Preferably, the method of said registration further includes: the remote electronic device receiving the first cryptographic authentication code (v1) of the first electronic device, wherein, the first cryptographic authentication code (v1) is a one-way function of a cross-stage secret key (u) of the first electronic device; and the remote electronic device using the first cryptographic authentication code (v1) and the common secret key (e) to verify that whether the first electronic device is in possession of the cross-stage secret key (u). Preferably, the method of said registration further includes: the remote electronic device receiving a second cryptographic authentication code (v2) from the first electronic device. Preferably, the method of said registration further includes: storing information so that the first cryptographic authentication code (v1) related to the first electronic device, the second cryptographic authentication code (v2) related to the first electronic device, and the cross-stage secret key (y) related to the first electronic device are retrievable across stages.

The disclosure further discloses a method of authentication in a first electronic device initiating a registration with a remote electronic device, wherein a method of said authentication includes: the first electronic device generating a temporary private key (a); the first electronic device calculating, based on the temporary private key (a), a temporary public key, wherein the temporary public key serves as a first public key (A1); the first electronic device getting an element password (x); the first electronic device generating a temporary private key (r); the first electronic device calculating, based on the element password (x), a one-way function of the temporary private key (r), wherein the one-way function of the temporary private key (r) serves as a second public key (A2); the first electronic device transmitting first information (w1) to the remote electronic device, wherein the first information (w1) includes the first public key (A1) and the second public key (A2); the first electronic device receiving second information (w2) from the remote electronic device, wherein the second information (w2) comprises a first public key (B1) and a second public key (B2); and the first electronic device calculating a common secret key (e), wherein, the common secret key (e) is determined based on a cross-stage secret key (u), the temporary private key (a), and the first public key (B1). Preferably, the method of said authentication further includes: the first electronic device getting the cross-stage secret key (u); the first electronic device calculating a one-way function of the cross-stage secret key (u), the one-way function of the cross-stage secret key serving as a first cryptographic authentication code (v1); and the first electronic device transmitting, based on the second information (w2), third information (w3) to the remote electronic device, wherein, the third information (w3) includes the first cryptographic authentication code (v1). Preferably, the method of said authentication further includes: the first electronic device calculating a cross-stage authentication code secret key (h), wherein, the cross-stage authentication code secret key (h) is determined based on the temporary secret key (r) and the second public key (B2); the first electronic device using the cross-stage authentication code secret key (h) as a message authentication code secret key, and the first electronic device using the first cryptographic authentication code (v1) as information to be authenticated to calculate a message authentication code, the message authentication code serving as the second cryptographic authentication code (v2); and the first electronic device transmitting the second cryptographic authentication code (v2) to the remote electronic device.

The disclosure further discloses a remote electronic device. A first electronic device initiates a registration with the remote electronic device, and the remote electronic device responds to registration information provided by the first electronic device. Such a remote electronic device includes: a mutual dynamic authentication module (MDA) configured to respond to the registration information of the first electronic device; and a memory configured to store secret key information, and connected to the mutual dynamic authentication module (MDA); wherein, the mutual dynamic authentication module (MDA) receives first information (w1) from the first electronic device, wherein the first information (w1) includes a first public key (A1) and a second public key (A2); and the mutual dynamic authentication module (MDA) generates a temporary private key (b), and uses the temporary private key (b) to calculates a temporary public key, the temporary public key serving as a first public key (B1); wherein, the mutual dynamic authentication module (MDA) further generates a cross-stage secret key (y), and the mutual dynamic authentication module (MDA) uses the second public key (A2) to calculate a one-way function of the cross-stage secret key (y), the one-way function of the cross-stage secret key (y) serving as a second public key (B2); wherein, the mutual dynamic authentication module (MDA) transmits, based on the first information (w1), second information (w2) to the first electronic device, the second information (w2) including the first public key (B1) and the second public key (B2); wherein, the mutual dynamic authentication module (MDA) calculates a common secret key (e), wherein the common secret key (e) is determined based on a first cryptographic authentication code (v1), the first public key (A1), and the transitory private key (b). Preferably, the remote electronic device receives the first cryptographic authentication code (v1) from the first electronic device, wherein the first cryptographic authentication code (v1) is a one-way function of a cross-stage secret key (u) of the first electronic device, and the remote electronic device uses the first cryptographic authentication code (v1) and the common secret key (e) to verify that whether the first electronic device is in possession of the cross-stage secret key (u) of the first electronic device. Preferably, the mutual dynamic authentication module (MDA) receives a second cryptographic authentication code (v2) from the first electronic device.

The disclosure further discloses a remote electronic device. A first electronic device initiates a registration with a remote electronic device, and the remote electronic device is configured to respond to the first electronic device initiating a registration, the remote electronic device including: a mutual dynamic authentication module (MDA) configured to respond to the first electronic device initiating a registration; a memory configured to store secret key information, and electronically connected to the mutual dynamic authentication module (MDA); an authenticator configured to enable a verifier to determine that the authenticator is in possession of secret key information from an issuer of a group of trusted devices, and that the secret key information does not reveal any unique authentication information related to the remote electronic device; an authenticator specific module (ASM) configured to provide a standard communication interface of the authenticator; wherein, the mutual dynamic authentication module (MDA) may be configured to: receive first information (w1) from the first electronic device, wherein, the first information (w1) includes a first public key (A1) and a second public key (A2); generate a temporary private key (b); use the temporary private key (b) to calculate a temporary public key, the temporary public key serving as a first public key (B1); generate a cross-stage secret key (y); use the second public key (A2) to calculate a one-way function of the cross-stage secret key (y), the one-way function of the cross-stage secret key serving as a second public key (B2); calculate a combined public key (D), wherein, the combined public key is a concatenation of the first public key (A1), the second public key (A2), and the first public key (B1); and get a credential and a signature from the authenticator specific module (ASM), wherein the credential attests to a verifier that a member public key (AKP) is a public key of a member belongs to the group of trusted devices, wherein the member public key (AKP) is a public key of an attestation key pair (AK), the attestation key pair (AK) is generated when the authenticator receives a signature request, and the signature is generated by using a private key (AKS) and based on the combined public key (D), the private key (AKS) being a private key of the attestation key pair (AK); wherein the mutual dynamic authentication module (MDA) transmits, based on the first information (w1), second information (w2) to the first electronic device, the second information (w2) including the first public key (B1), the second public key (B2), and signature information ($S_B$), wherein the signature information ($S_B$) is information related to the remote electronic device and the signature information ($S_B$) includes the credential and the signature; wherein, the mutual dynamic authentication module (MDA) calculates a common secret key (e), the common secret key (e) being determined based on the first cryptographic authentication code (v1), the first public key (A1), and the transitory private key (b). Preferably, the authenticator specific module (ASM) may be configured to: get an identifier (rpid) of a relying party, wherein the relying party is configured to authenticate the mutual dynamic authentication module (MDA); wherein the signature is generated by using the private key (AKS), based on an inclusion of the combined public key (D) and the identifier (rpid) of the relying party. Preferably, the mutual dynamic authentication module (MDA) may be configured to: get a direct anonymous attestation group credential (DAA group credential) and a direct anonymous attestation signature (DAA signature) from the authentication specific module (ASM), wherein, the direct anonymous attestation group credential (DAA group credential) attests to a verifier that the remote electronic device is a member of a group of trusted devices, and enables the verifier to determine that the authenticator is in possession of uncompromised secret key information from an issuer of the group of trusted devices, and that the authenticator does not reveal any authentication information related to the remote electronic device, wherein the direct anonymous attestation signature is a unique signature generated by using a unique signature secret key, based on an inclusion of the member public key (AKP), wherein the unique signature secret key is provided by using a secret key of a member for attesting to the verifier that the remote electronic device is a member of the group of trusted devices and does not reveal unique authentication information, and enabling the signature information ($S_B$) to include the direct anonymous attestation group credential (DAA group credential) and the technology of direct anonymous attestation signature (DAA signature).

The disclosure further discloses a method of authentication between devices, applicable to a first electronic device, and a remote electronic device. The first electronic device is connected to the remote electronic device. The method of authentication between devices includes: the remote electronic device using stored information, so that a first cryptographic authentication code (v1) related to the first electronic device, a second cryptographic authentication code (v2) related to the first electronic device, and a cross-stage secret key (y) related to the first electronic device are retrieved; receiving first information (w1') from the first electronic device, wherein the first information (w1') includes a first public key (A1') and a second public key (A2'); generating a temporary private key (b'); using the temporary private key (b') to calculate a temporary public key, the temporary public key serving as a first public key (B1'); the remote electronic device transmitting, based on the first information (w1'), second information (w2') to the first electronic device, wherein the second information (w2') includes the first public key (B1'); and calculating a common secret key (e'), wherein the common secret key (e') is determined based on a first cryptographic authentication code (v1), the first public key (A1), and the temporary private key (b').

Preferably, the method of authentication between devices further includes: the remote electronic device using the first cryptographic authentication code (v1) and the common secret key (e') to verify that whether the first electronic device is in possession of a cross-stage secret key (u) of the first electronic device. Preferably, the method of authentication between devices further includes: using the second public key (A2') to calculate a one-way function of the cross-stage secret key (y) as a second public key (B2'); and transmitting the second public key (B2') and the second cryptographic authentication code (v2) to the first electronic device.

The disclosure further discloses a method of mutual authentication between devices, applied to a first electronic device, and a remote electronic device. The first electronic device is connected to the remote electronic device. The method of mutual authentication between devices includes: the first electronic device generating a temporary private key (a'); using the temporary private key (a') to calculate a temporary public key, the temporary public key serving as a first public key (A1'); getting an element password (x); generating a temporary private key (r'); using the element password (x) to calculate a one-way function of the temporary private key (r'), the one-way function of the temporary private key (r') serving as a second public key (A2'); the first electronic device transmitting first information (w1') to the remote electronic device, wherein, the first information (w1') includes the first public key (A1') and the second public key (A2'); the first electronic device receiving second information (w2') from the remote electronic device, wherein the second information (w2') includes a first public key (B1'); and calculating a common secret key (e'), wherein the common secret key (e') is determined based on a cross-stage secret key (u) and the temporary private key (a') and the first public key (B1'). Preferably, the method of mutual authentication between devices further includes: getting a cross-stage secret key (u); and attesting to the remote electronic device a possession of the cross-stage secret key (u). Preferably, the method of mutual authentication between devices further includes: the first electronic device receiving a second public key (B2') from the remote electronic device; calculating a cross-stage authentication code secret key (h), wherein the cross-stage authentication code secret key (h) is determined based on the temporary private key (r') and the second public key (B2'); the first electronic device receiving a second cryptographic authentication code (v2) from the remote electronic device; using the cross-stage authentication code secret key (h) as a message authentication code secret key and using a first cryptographic authentication code (v1) as information to be authenticated to calculate a message authentication code, and verifying whether the message authentication code matches the second cryptographic authentication code (v2).

The disclosure further discloses a remote electronic device. A first electronic device initiates a registration with the remote electronic device, and the remote electronic device responds to the first electronic device for mutual authentication. Such a remote electronic device includes: a mutual dynamic authentication module (MDA) configured to process authentication information of the first electronic device and authentication information of the remote electronic device, wherein the first electronic device and the remote electronic device are in a mutual authentication; and a memory configured to store secret key information, the memory being connected electronically to the mutual dynamic authentication module (MDA); wherein, the mutual dynamic authentication module (MDA) uses multiple pieces of information from the memory, to get a first cryptographic authentication code (v1) related to the first electronic device, a second cryptographic authentication code (v2) related to the first electronic device, and a cross-stage secret key (y) related to the first electronic device; wherein the mutual dynamic authentication module (MDA) receives first information (w1') from the first electronic device, the first information (w1') including a first public key (A1') and a second public key (A2'); wherein the mutual dynamic authentication module (MDA) generates a temporary private key (b'), and calculates, based on the temporary private key (b'), a temporary public key, the temporary public key serving as a first public key (B1'); the mutual dynamic authentication module (MDA) transmits, based on the first information (w1'), second information (w2') to the first electronic device, the second information (w2') including the first public key (B1'); wherein the mutual dynamic authentication module (MDA) calculates a common secret key (e'), the common secret key (e') being determined based on the first cryptographic authentication code (v1), the first public key (A1') of the first information (w1'), and the temporary private key (b'). Preferably, the mutual dynamic authentication module (MDA) uses the first cryptographic authentication code (v1) and the common secret key (e') to verify that whether the first electronic device is in possession of a cross-stage secret key (u) of the first electronic device. Preferably, the mutual dynamic authentication module (MDA) uses the second public key (A2') of the first information (w1') to calculate a one-way function of the cross-stage secret key (y), wherein the one-way function of the cross-stage secret key (y) serves as a second public key (B2'), and the mutual dynamic authentication module (MDA) transmits the second public key (B2') of the second information and the second cryptographic authentication code (v2) to the first electronic device.

The disclosure further discloses a first electronic device, connected to a remote electronic device for mutual authentication with the remote electronic device, the first electronic device including: a mutual dynamic authentication module (MDA) configured to initiate a mutual authentication between the first electronic device and the remote electronic device; wherein the mutual dynamic authentication module (MDA) generates a temporary private key (a'), and uses the temporary private key (a') to calculate a temporary public key, the temporary public key serving as a first public key (A1'); wherein the mutual dynamic authentication module (MDA) gets an element password (x), and, the mutual dynamic authentication module (MDA) generates a temporary private key (r'), the mutual dynamic authentication module (MDA) uses the element password (x) to calculate a one-way function of the temporary private key (r'), the one-way function of the temporary private key (r') serving as a second public key (A2'); wherein the mutual dynamic authentication module (MDA) transmits first information (w1') to the remote electronic device, the first information (w1') including the first public key (A1') and the second public key (A2'); wherein, the mutual dynamic authentication module (MDA) receives second information (w2') from the remote electronic device, the second information (w2') including a first public key (B1'); wherein the mutual dynamic authentication module (MDA) calculates a common secret key (e'), the common secret key (e') being determined based on a cross-stage secret key (u), the temporary private key (a'), and the first public key (B1') of the second information (w2'). Preferably, the mutual dynamic authentication module (MDA) gets the cross-stage secret key (u), and attests to the remote electronic device that the first electronic device is in possession of the cross-stage secret key (u). Preferably, the mutual dynamic authentication module (MDA) receives a second public key (B2') of the remote electronic device from the remote electronic device, the mutual dynamic authentication module (MDA) calculates a cross-stage authentication code secret key (h), wherein the cross-stage authentication code secret key (h) is determined based on the temporary private key (r') and the second public key (B2'), wherein the mutual dynamic authentication module (MDA) receives a second cryptographic authentication code (v2) from the remote electronic device. The mutual dynamic authentication module (MDA) uses the cross-stage authentication code secret key (h) as a message authentication code secret key, and uses a first cryptographic authentication code (v1) as information to be authenticated, to calculate a message authentication code, and verify that whether the message authentication code matches the second cryptographic authentication code (v2).

One of effects of the disclosure is to provide a system of an authentication and a method of an authentication, to resist that an attacker's impersonating using a cryptographic authentication code, and to enhance a security experience. In order to further understand features and the technical contents of the disclosure, please refer to the following detailed descriptions and drawings. However, the drawings provided are merely used to provide references and descriptions, and are not intended to limit the disclosure.

DRAWINGS

DETAILED DESCRIPTIONS

Figure 1:
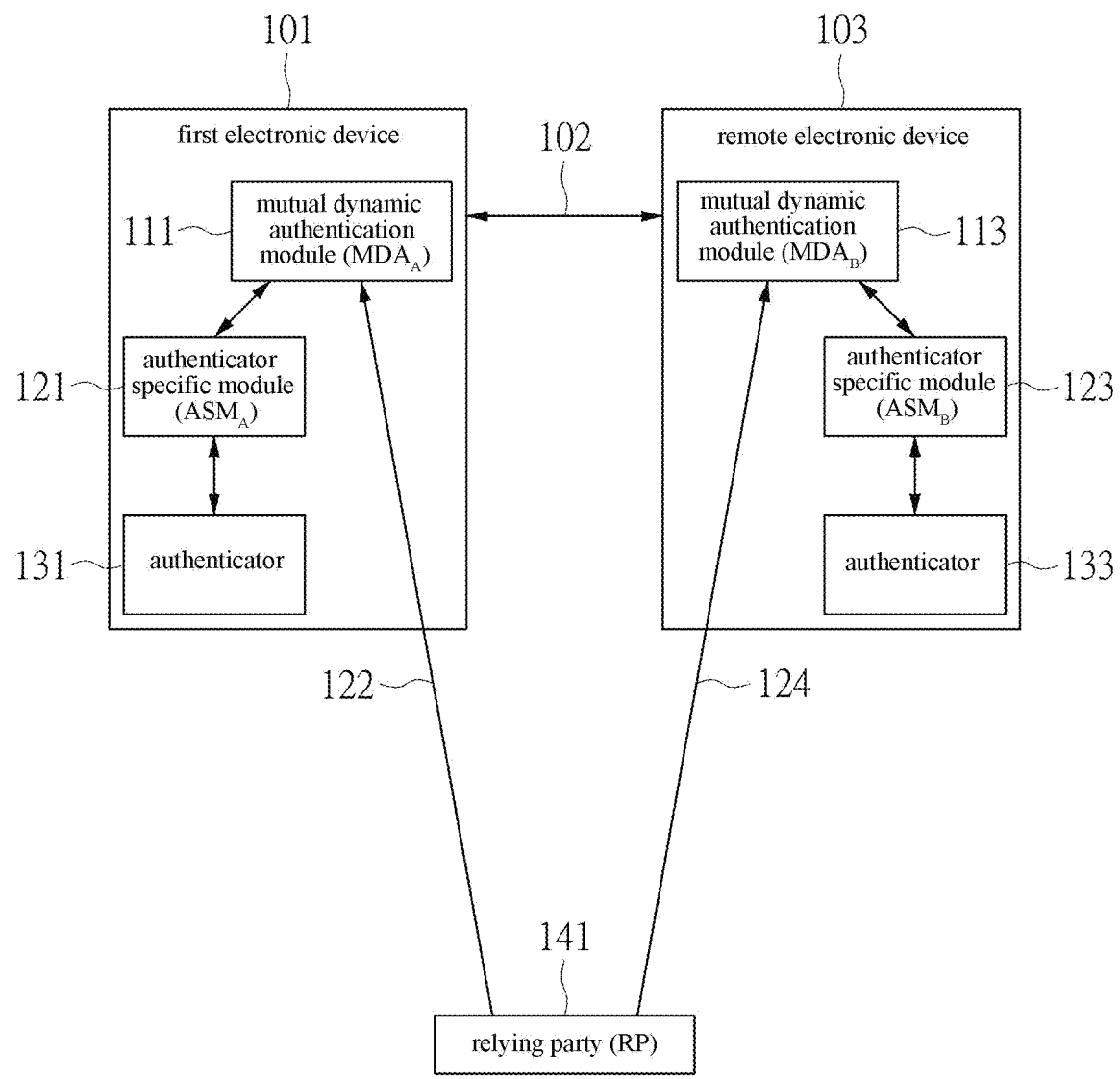
FIG. 1 is a schematic diagram of an identity authentication system between devices.

The followings use specific embodiments to explicate implementations of a first electronic device, a remote electronic device, and a method of an authentication between devices disclosed by the disclosure. In addition, the drawings of the disclosure are merely schematic, and are not drawn according to actual sizes. It is declared in advance that the following embodiments further describe the related technical content of the present disclosure in detail, but the disclosed contents are not intended to limit the scope of protection of the disclosure. In addition, the term "or" as used herein should be taken to include, as the case may be, any one or combination of more of the associated listed items.

Preface

The following detailed descriptions describe numerous details for a more thorough understanding of embodiments of the disclosure. But one skilled in the art is enabled to make and use the disclosure without such specific details. In other circumstances, well-known structures, devices, and methods are not shown in detail in order to avoid obfuscations of embodiments of the disclosure. Part of the following detailed descriptions about technology of data bit operations in a memory of a computer is shown in symbolic representative ways. The ways of describing technology are used by one skilled in the art. The symbolic representative ways includes conversion among numbers/values, bytes, and strings, encoding and decoding, are used by one skilled in the art of data processing to effectively convey the essences of their works to the other one skilled in the art. Technology here is conventionally understood as a series of consistent steps and results to achieve expected results. Said steps require that an entity controls manipulations of quantities. Usually but not necessarily, such quantities manifested through electronic or magnetic signals are storable, or transferable, or combinable, or comparable, or otherwise manipulable. It has proven that it is convenient at times, primarily for the reasons of common usages, to refer to these signals as bits, or values, or numbers, or integers, or strings, or symbols, or physical (electronic) quantities, or etc. It should be borne in mind, however, that all of these and similar terms are to be associated with appropriate physical quantities and are merely used for the convenience of labeling these quantities. Unless specifically described otherwise as apparent from the following descriptions, it is appreciated that throughout the whole content, a discussion of terms such as "manipulating" or "calculating" or "verifying" or "checking" or "displaying" or "generating", or "executing", or "authenticating", or "authentication", or etc, refers to the actions and executions of a computer system, or a similar electronic device, that manipulates and transforms data represented as physical (electronic) quantities within the computer system's registers and memories into other data that is similarly represented as quantities within the computer system memories or registers or other such information storage, or transmission or display devices, or etc. In the following content, certain terms are used to describe certain features or structures of one or more embodiments of the disclosure. For example, a "device" is defined as any type of communication device that is adapted to transmit and receive information. Examples of various implementations of a device include, but are not limited or restricted to, computers, or personal digital assistants, or cellular telephones, or set-top boxes, or facsimile machines, or printers, or modems, or routers, or chips, or chipsets, or processors, or other form factor devices including integrated circuits, or other similar devices that includes logic circuits for executing any operation according to one of embodiments, such as bank cards, or credit cards, or identification cards or sensing systems, or sensors, or telemeters or the like. A "channel" is broadly defined as one or more information carrying mediums adapted to a platform. Examples of various implementations of a channel include, but are not limited or restricted to, electrical wires, or optical fibers, or cables, or bus traces, or wireless signaling technology, etc. Embodiments also relate to devices configured to execute the operations herein. Some devices may be specially configured to the required purposes, or may include a general-purpose computer selectively activated or reconfigured by a computer program stored in the computer. Such a computer program may be stored in a computer readable storage medium, such as, but not limited to, any type of disk including floppy disks, or optical disks, or CD-ROMs, or DVD-ROMs, or magnetic optical disks, or read only memories (ROMs), or random access memories (RAMs), or EPROMs, or EEPROMs, or NVRAMs, or magnetic or optical cards, or any type of medium suitable for storing electronic instructions, and coupled to a computer system bus, respectively. The technology and drawings presented herein are not inherently related to any particular computers or other devices. Various general-purpose systems may be used with programs in accordance with the teachings herein, or it may prove that it is convenient to construct more specialized devices to execute the required steps of methods. For multiple such systems, the required structure is more manifested from the following descriptions. In addition, embodiments of the disclosure are not described with respect to any particular programming language. It will be appreciated that a variety of programming languages may be used to implement the teachings of the disclosure as described herein. A machine readable medium includes any mechanism for storing or transmitting information in a form readable by a machine (e.g., a computer). For example, a machine-readable medium includes read only memory (ROM), or random access memory (RAM), or magnetic disk storage media, or optical storage media, or flash memory devices, etc.

First Embodiment

Please refers to FIG. 1. A system of an authentication between devices includes a first electronic device (101), a remote electronic device (103), and a relying party (RP) (141). The first electronic device (101) is connected to the remote electronic device (103). The first electronic device (101) and the remote electronic device (103) are connected to the relying party (RP) (141), respectively. The first electronic device (101) includes a mutual dynamic authentication module ($MDA_A$) (111), an authenticator specific module ($ASM_A$) (121), and an authenticator (131). The mutual dynamic authentication module ($MDA_A$) (111) is connected to the authenticator specific module ($ASM_A$) (121). The authenticator specific module ($ASM_A$) (121) is connected to the authenticator (131). The remote electronic device (103) includes a mutual dynamic authentication module ($MDA_B$) (113), an authenticator specific module ($ASM_B$) (123) and an authenticator (133). The mutual dynamic authentication module ($MDA_B$) (113) is connected to the authenticator specific module ($ASM_B$) (123). The authenticator specific module ($ASM_B$) (123) is connected to the authenticator (133). In the embodiment, the mutual dynamic authentication module ($MDA_A$) (111) and the mutual dynamic authentication module ($MDA_B$) (113) may be implemented as hardwares (such as controllers), or softwares, or firmwares, etc. In other embodiments, the authenticator specific module ($ASM_A$) (121) and the authenticator (131) are optionally provided in the first electronic device (101). That is, the first electronic device (101) may be configured without the authenticator specific module ($ASM_A$) (121) and the authenticator (131) or configured with only one selected from them. Similarly, the authenticator specific module ($ASM_B$) (123) and the authenticator (133) may be optionally provided in the remote electronic device (103). That is, the remote electronic device (103) may be configured without the authenticator specific module ($ASM_B$) (123) and the authenticator (133) or configured with only one selected from them. In other embodiments, the system may optionally include the authenticator specific module ($ASM_A$) (121), or the authenticator (131) of the first electronic device. The system may optionally include the authenticator specific module ($ASM_B$) (123) or the authenticator (133) of the remote electronic device. In the embodiment, the relying party (RP) (141) is configured to authenticate the mutual dynamic authentication module ($MDA_A$) (111) and the mutual dynamic authentication module ($MDA_B$) (113). In the embodiment, the relying party (RP) (141) is configured to authenticate a channel (122) and the mutual dynamic authentication module ($MDA_A$) (111). In the embodiment, the relying party (RP) (141) is configured to authenticate a channel (124) and the mutual dynamic authentication module ($MDA_B$) (113). In an embodiment, the authenticator specific module ($ASM_A$) (121) provides a standard communication interface of the authenticator (131) of the first electronic device. The authenticator specific module ($ASM_A$) (121) checks that whether the mutual dynamic authentication module ($MDA_A$) (111) has been authenticated by the relying party (RP) (141). In an embodiment, the authenticator specific module ($ASM_B$) (123) provides a standard communication interface of the authenticator (133) of the remote electronic device. The authenticator specific module ($ASM_B$) (123) checks that whether a mutual dynamic authentication module ($MDA_B$) (113) has been authenticated by the relying party (RP) (141). The authenticator specific module ($ASM_A$) (121) provides a standard communication interface of the authenticator (131). The authenticator specific module ($ASM_A$) (121) of the first electronic device (101) checks the mutual dynamic authentication module ($MDA_A$) (111), based on an authentication of the relying party (RP) (141). The authenticator specific module ($ASM_B$) (123) of the remote electronic device (103) provides a standard communication interface of the authenticator (133). The authenticator specific module ($ASM_B$) of the remote electronic device (103) checks the mutual dynamic authentication module ($MDA_B$) (113), based on that an authentication of the relying party (RP) (141). In the embodiment, the first electronic device (101) and the remote electronic device (103) may be communicatively connected via the channel (102) to form part of a local area network or wide area network, existing network infrastructure, or any combination thereof, etc., which may include: a point to point channel of a computer system, or mutually connected internet of things, or company's enterprise networks, or the Internet, or other similar networks.

Second Embodiment

Figure 2:
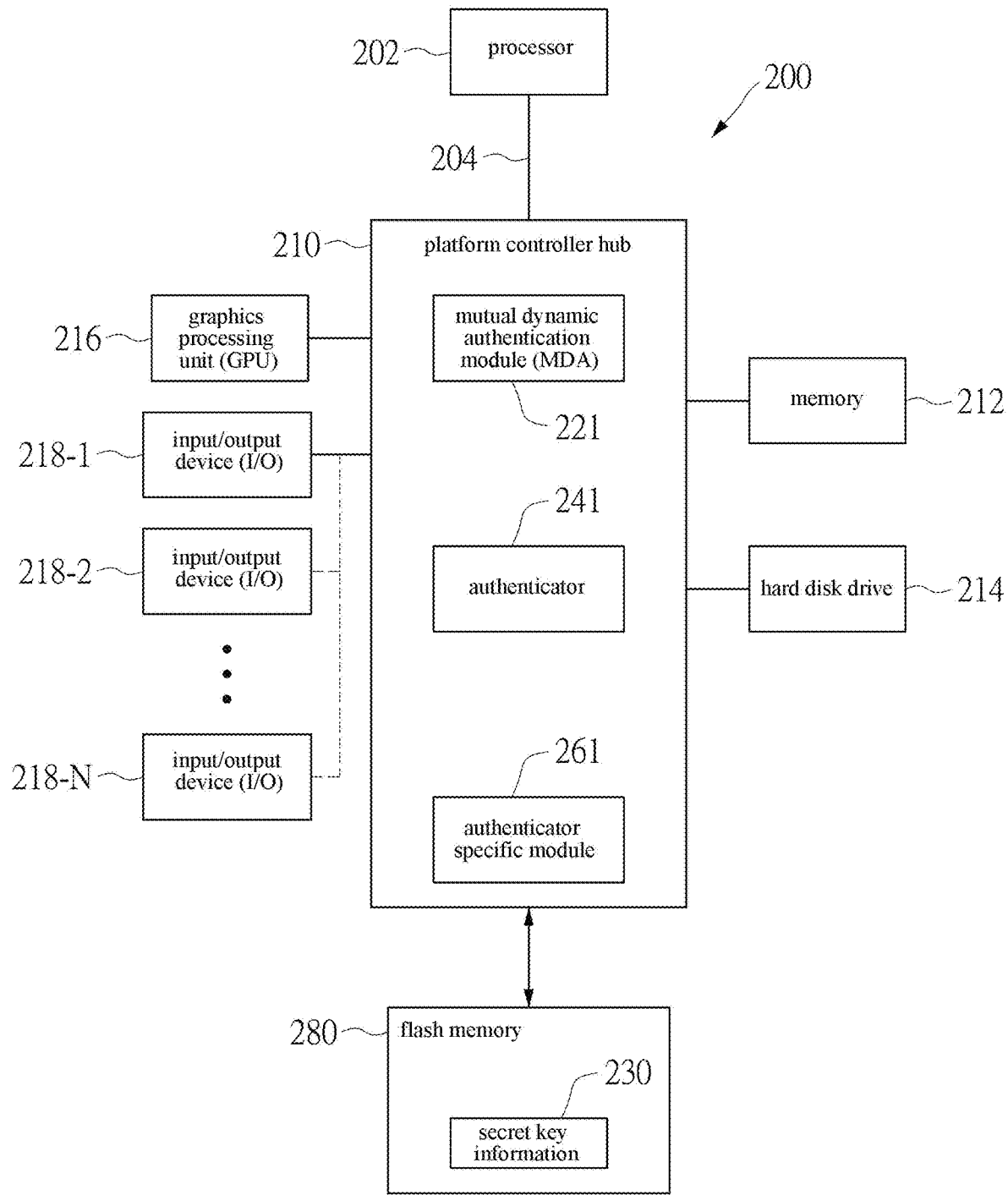
FIG. 2 is a diagram of an internal configuration of a device.

Please refer to FIG. 2. A device (200) includes a processor (202), a platform controller hub (210), a mutual dynamic authentication module (MDA) (221), a memory (212), a hard disk drive (214), a graphics processing unit (GPU) (216), a flash memory (280), and input/output devices (I/O) (218-1 . . . 218-N). In the embodiment, the flash memory (280) stores secret key information (230). In addition, in another embodiment, the device (200) may optionally include an authenticator (241) and an authenticator specific module (261). In the embodiment, the authenticator specific module (261) is configured to provide a standard communication interface of the authenticator (241). The authenticator (241) is a trusted platform module (TPM). In the embodiment, the authenticator (241) of the device (200) is configured to enable a verifier to determine that the device (200) is in possession of uncompromised secret key information, and that the uncompromised secret key information does not reveal secret key information or any unique authentication information of the device. The authenticator (241) includes a unique group credential and a member secret key to provide a unique signature secret key. In the embodiment, the authenticator (241) is configured in the device (200), and configured to use a unique signature secret key (230) to generate an attestation information, to attest to a verifier that the device (200) is a member of a group of trusted devices issued by an issuer, and that the attestation information does not reveal any unique authentication information of the device that include a signature secret key. Representatively, the device (200) includes a channel (204) configured for transmitting information between the processor (202) and the platform controller hub (210). As described herein, the platform controller hub (210) or a chipset may be coupled to multiple devices of the processor (202) to execute expected functions of the system. In the embodiment, the graphics processing unit (GPU) (216), the hard disk drive (214), and the memory (212) are coupled to the platform controller hub (210). In the embodiment, the platform controller hub (210) further includes a memory controller, or a input/output controller, or both of the memory controller and the input/output controller, to communicate with input/output devices (218-1 . . . 218-N). The platform controller hub (210) is configured to operate as a graphics memory controller hub (GMCH) by incorporating a graphics processing unit (216). In the embodiment, the memory (212) includes a random access memory (RAM), or a dynamic RAM (DRAM), a static RAM (SRAM), or a synchronous DRAM (SDRAM), or a double data rate (DDR) SDRAM (DDR-SDRAM), or a Rambus DRAM (RDRAM), or any device capable of supporting high-speed buffering of data, etc.

Third Embodiment

Figure 3:
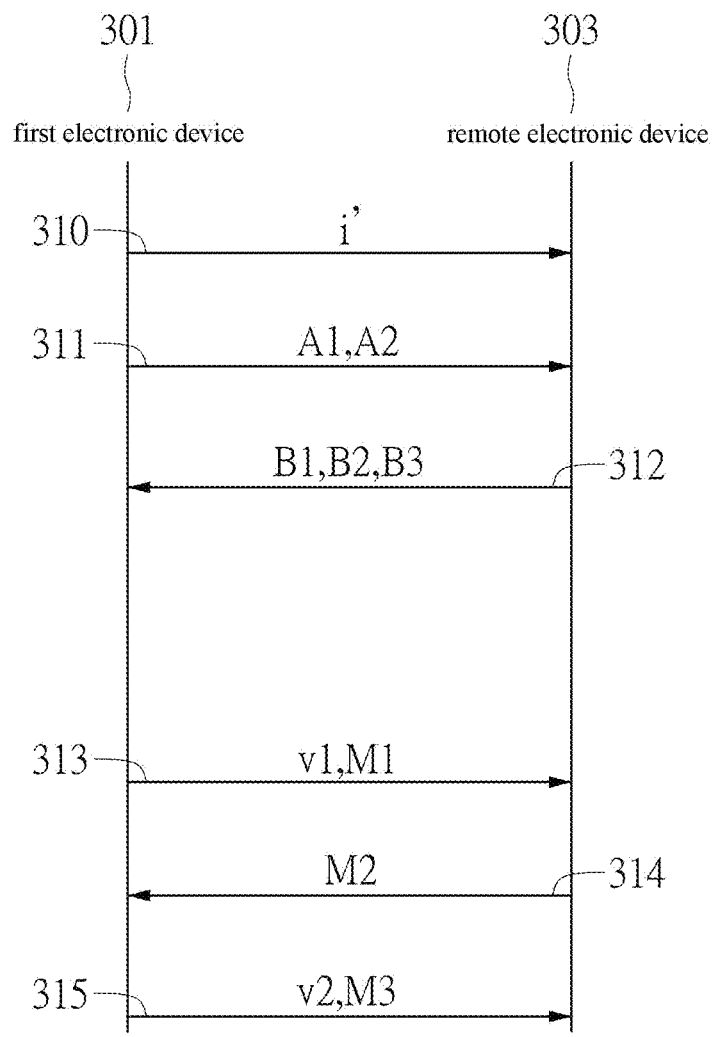
FIG. 3 is a flow chart in a registration stage.

Please refer to FIG. 3. In the embodiment, a first electronic device (301) gets an identity (i) and a password (p), calculates an identifier (i'), wherein i'=H1($i$)), and generates two random integer numbers/values larger than 0 and less than q. That is, the first electronic device (301) can calculate, based on a temporary private key (a) and a temporary private key (r), an element password (x), wherein x=Z(p), calculate a first public key (A1), wherein A1=$g^a$, and calculate a second public key (A2), wherein A2=$x^r$. First, the first electronic device (301) transmits (i') to a remote electronic device (303) (step 310); And, the first electronic device (301) transmits first information (w1) to the remote electronic device (303) (step 311), wherein the first information (w1) includes the first public key (A1) and the second public key (A2). The remote electronic device (303) verifies that whether the first public key (A1) and the second public key (A2) belong to a set (G). The first public key (A1) and the second public key (A2) are obtained from the received first information (w1). If the result of the verification is a mismatch, the connection will be aborted. In the embodiment, the remote electronic device (303) checks whether the identifier (i') has been registered. And, if the identifier (i') checked by the remote electronic device (303) has not been registered, the remote electronic device (303) generates a random integer number/value larger than 0 and less than q, i.e., a temporary private key (b). In other embodiments, if the identifier (i') checked by the remote electronic device (303) has not been registered, the remote electronic device (303) generates a random integer number/value larger than 0 and less than q, i.e., a cross-stage secret key (y) of the remote electronic device (303) related to the identifier (i') and specific to the identifier (i'). In the embodiment, the remote electronic device (303) calculates a first public key (B1), wherein B1=$g^b$, and calculates a second public key (B2), wherein B2=$A2^y$. In an embodiment, if the identifier (i') checked by the remote electronic device (303) has not been registered, the remote electronic device (303) generates a random integer number/value larger than 0 and less than q, i.e., a cross-stage secret key (o) of the remote electronic device (303) related to the identifier (i') and specific to the identifier (i'). And, the remote electronic device (303) further calculates a third public key (B3), wherein B3=$A2^o$. And, the remote electronic device (303) transmits second information (w2) to the first electronic device (301) (step 312), wherein the second information (w2) includes the first public key (B1) and the second public key (B2). In other embodiments, the remote electronic device (303) transmits second information (w2) to the first electronic device (301) (step 312), wherein the second information (w2) includes the first public key (B1), the second public key (B2), and the third public key (B3). That is, the remote electronic device (303) may transmit multiple public keys to the first electronic device (301). In other words, the first electronic device (301) receives the second information (w2) from the remote electronic device (303), wherein the second information (w2) includes the first public key (B1) and the second public key (B2). In other embodiments, the first electronic device (301) receives the second information (w2) from the remote electronic device (303), wherein the second information (w2) includes the first public key (B1), the second public key (B2), and the third public key (B3). In the embodiment, the first electronic device (301) verifies whether the first public key (B1) and the second public key (B2) belong to a set (G). If the result of the verification is a mismatch, the connection will be aborted. In other embodiments, the first electronic device (301) verifies whether the first public key (B1), the second public key (B2), and the third public key (B3) belong to a set (G). If the result of the verification is a mismatch, the connection will be aborted. In the embodiment, the first electronic device (301) calculates a common integer number/value (d), wherein d=H2(A1∥B1). The first electronic device (301) calculates a cross-stage secret key (u) specific to an identity (i), wherein u=H3($i$∥p)). In other embodiment, based on a secure salt (t), the element password (x), and the identity (i), the first electronic device (301) uses a key derivation function (KDF(x, t, i)), to calculate a cross-stage secret key (u) specific to (i), wherein t=$B3^{1/r}$. A "secure salt"

refers to the encryption of "salt" in cryptography. In the embodiment, the first electronic device (301) generates a random integer number/value, i.e., the cross-stage secret key (u) specific to the identity (i). The stored information in a memory of the first electronic device (301) is used to enable the cross-stage secret key (u) to be retrievable across stages. In addition, in another embodiment, the first electronic device (301) calculates a first cryptographic authentication code (v1), wherein $v1=g^u$. The first electronic device (301) further calculates a common secret key (e), wherein $e=g^{udb} \times g^{ab}$. The common secret key (e) may be calculated from $(B1^{ud} \times B1^a)$. It calculates a common session key (k1) and a message authentication code secret key (m1), wherein $k1\|m1=PRF(e)$. (PRF) is a pseudo random function, which performs calculations using the common session secret key (k1) and the message authentication code secret key (m1). The first electronic device (301) calculates a first concatenation (x1), and calculate a first message authentication code (M1), wherein $M1=MAC_{m1}(x1)$. ($MAC_{m1}$) is a function of generating a message authentication code, wherein a subscript (m1) denotes that a message authentication code secret key used by the function of generating the message authentication code is (m1). Further, the first electronic device (301) transmits third information (w3) to the remote electronic device (303) (step 313), wherein the third information (w3) includes the first cryptographic authentication code (v1) and the first message authentication code (M1). In other words, the remote electronic device (303) receives the third information (w3), wherein the third information (w3) includes the first cryptographic authentication code (v1) and the first message authentication code (M1). In the embodiment, the remote electronic device (303) verifies whether the first cryptographic authentication code (v1) belongs to a set (G). If the result of the verification is a mismatch, the connection will be aborted. In addition, in another embodiment, the remote electronic device (303) calculates a common integer number/value (d), wherein $d=H2(A1\|B1)$. In the embodiment, the remote electronic device (303) calculates a common secret key (e), wherein $e=g^{udb} \times g^{ab}$, and the common secret key (e) may be obtained from $(v1^{db} \times A1^b)$. In an embodiment, the remote electronic device (303) calculates a common session key (k2) and a message authentication code secret key (m2), wherein $k2\|m2=PRF(e)$. In an embodiment, the remote electronic device (303) calculates a first concatenation (x1), and verifies that the first message authentication code M1 is equal to $MAC_{m2}(x1)$, i.e., $M1=MAC_{m2}(x1)$. If the result of the verification is a mismatch, the connection will be aborted. The remote electronic device (303) further calculates a second concatenation (x2), and calculates a second message authentication code (M2), wherein $M2=MAC_{m2}(x2)$. The remote electronic device (303) transmits fourth information (w4) to the first electronic device (301) (step 314), wherein the fourth information (w4) includes the second message authentication code (M2). In other words, the first electronic device (301) receives the fourth information (w4), wherein the fourth information (w4) includes the second message authentication code (M2). In an embodiment, the first electronic device (301) calculates a second concatenation (x2), and verifies that the second message authentication code (M2) is equal to $MAC_{m1}(x2)$, i.e., $M2=MAC_{m1}(x2)$, wherein the second message authentication code (M2) is obtained from the fourth information (w4). If the result of the verification is a mismatch, the connection will be aborted. In other embodiments, the first electronic device (301) calculates a cross-stage message authentication code secret key (h), wherein $h=B2^{1/r}=x^y$, and calculates a second cryptographic authentication code (v2), wherein $v2=MAC_h(v1)$. The first electronic device (301) uses the common session secret key (k1) to establish a secure channel, and transmits fifth information (w5) to the remote electronic device (303) via the secure channel (step 315). The fifth information (w5) includes information so that the remote electronic device (303) may get information about the second cryptographic authentication code (v2) and a third message authentication code (M3). The third message authentication code (M3) is used for authenticating that the fifth information is from the first electronic device (301). In addition, in another embodiment, the remote electronic device (303) uses the common session secret key (k2) to establish a secure channel, receives the fifth information (w5) via a secure channel, and uses the fifth information (w5) to get the second cryptographic authentication code (v2) and the third message authentication code (M3), wherein the third message authentication code (M3) is used for authenticating that a fifth information is from the first electronic device (301). The remote electronic device (303) further verifies that the third message authentication code (M3). If the verification is qualified, it stores information so that the identifier (i'), the first cryptographic authentication code (v1) related to the identifier (i'), the second cryptographic authentication code (v2) related to the identifier (i'), and the cross-stage secret key (y) related to the identifier (i') are retrievable across stages. In an embodiment, the remote electronic device (303) verifies the third message authentication code (M3). If the verification is qualified, it stores information so that the identifier (i'), the first cryptographic authentication code (v1) related to the identifier (i'), the second cryptographic authentication code (v2) related to the identifier (i'), and another cross-stage secret key (o) related to the identifier (i') are retrievable across stages.

Fourth Embodiment

Figure 4:
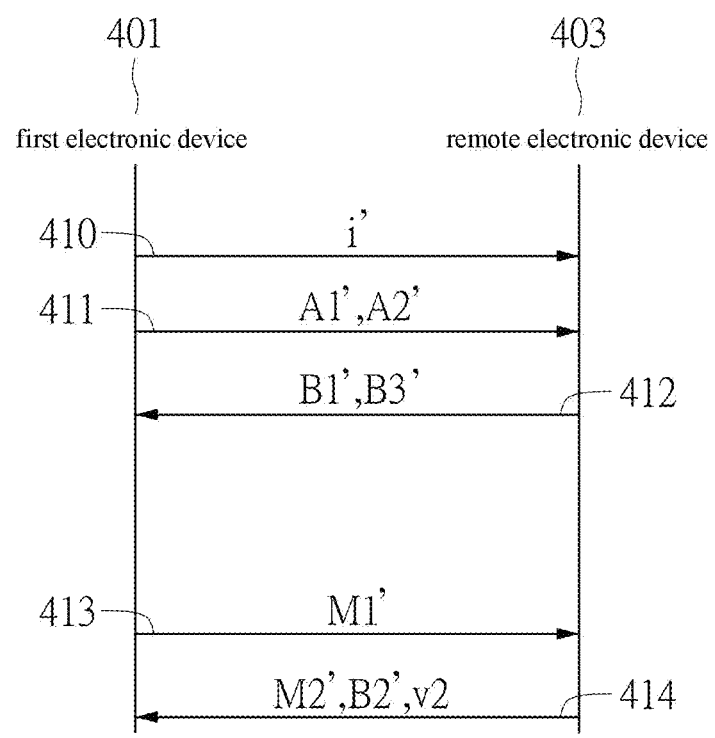
FIG. 4 is a flow chart in an authentication stage.

Please refer to FIG. 4. In the embodiment, a first electronic device (401) gets an identity (i) and a password (p), calculates an identifier (i'), wherein $i'=H1(i)$, and generates a random integer number/value larger than 0 and less than q, which is a temporary private key (a'). In addition, in another embodiment, the first electronic device (401) calculates an element password (x), wherein $x=Z(p)$, to calculate and obtain a first public key (A1'), wherein $A1'=g^a$. In addition, in another embodiment, the first electronic device (401) generates a random integer number/value larger than 0 and less than q, which is a temporary private key (r'), to calculate a second public key (A2'), wherein $A2'=x^{r'}$. In the embodiment, first, the first electronic device (401) transmits the identifier (i') to a remote electronic device (403) (step 410). The first electronic device (401) transmits first information (w1') to the remote electronic device (403) (step 411), wherein the first information (w1') includes the first public key (A1') and the second public key (A2'). The remote electronic device (403) gets the first information (w1'), wherein the first information (w1') includes the first public key (A1') and the second public key (A2'). The remote electronic device (403) verifies that the first public key (A1') and the second public key (A2') belong to a set (G). If the result of the verification is a mismatch, the connection will be aborted. In the embodiment, the remote electronic device (403) checks whether the identifier (i') has been registered. When the remote electronic device (403) checks that the identifier (i') has been registered, the remote electronic device (403) uses stored information so that a first cryptographic authentication code (v1), a second cryptographic authentication code (v2), and a cross-stage secret key (y) are retrieved based on an inclusion of the identifier (i'). In the embodiment, when the remote electronic device (403) checks that the identifier (i') has been registered, the remote electronic device (403) uses stored information so that a first cryptographic authentication code (v1) related to the identifier (i'), a second cryptographic authentication code (v2) related to the identifier (i'), a cross-stage secret key (y) related to the identifier (i'), and a cross-stage secret key (o) related to the identifier (i') are retrieved based on an inclusion of the identifier (i'). The remote electronic device (403) generates a random integer number/value larger than 0 and less than q, i.e., a temporary private key (b') of the remote electronic device (403). In addition, in another embodiment, the remote electronic device (403) generates a random integer number/value larger than 0 and less than q, i.e., a temporary public key of the remote electronic device (403), wherein the temporary public key B1' is equal to $g^b$ (B1'=$g^{b'}$). Further, the remote electronic device (403) calculates a common integer number/value (d'), wherein d'=H2 (A1'∥B1'). In addition, in another embodiment, the remote electronic device (403) further generates a third public key B3' of the remote electronic device (403), wherein B3'=$A2^{r^s}$. The remote electronic device (403) transmits second information (w2') to the first electronic device (401) (step 412), wherein the second information (w2') includes the temporary public key (B1'). In addition, in another embodiment, the remote electronic device (403) transmits the second information (w2') to the first electronic device (401) (step 412), wherein the second information (w2') includes the temporary public key (B1') and the third public key (B3'). The first electronic device (401) verifies that whether the temporary public key (B1') belongs to a set (G), wherein the temporary public key (B1') is obtained from the second information (w2'). If the result of the verification is a mismatch, the connection will be aborted. In addition, in another embodiment, the first electronic device (401) verifies that the temporary public key (B1') and the third public key (B3') belong to a set (G), wherein the temporary public key (B1') and the third public key (B3') are obtained from the second information (w2'). If the result of the verification is a mismatch, the connection will be aborted. The first electronic device (401) calculates a common integer number/value (d'), wherein d'=H2(A1'∥B1'). In addition, in another embodiment, the first electronic device (401) further calculates a cross-stage secret key (u) specific to (i), wherein u=H3(i∥p). In other embodiment, the first electronic device (401) uses, based on a secure salt (t) and an element password (x) and an identity (i), a secret key derivation function (KDF(x, t, i)) to calculate the cross-stage secret key (u) specific to the identity (i). The secure salt (t)=$B3'^{t/n}$=$x^s$. In the embodiment, the first electronic device (401) uses the identity (i) and stored information to get the cross-stage secret key (u). The first electronic device (401) further calculates a first cryptographic authentication code (v1), wherein v1=$g^u$. The first electronic device (401) calculates an authentication stage common secret key (e'), wherein e'=$g^{ud'b'} \times g^{a'b'}$, and the authentication stage common secret key (e') may be calculated from ($B1'^{ud'} \times B1'^{a'}$). The first electronic device (401) calculates a common session secret key (k1') and a message authentication code secret key (m1'), wherein k1'∥m1'=PRF(e'). In an embodiment, a first electronic device (401) calculates a first concatenation (x1'), and calculates a first message authentication code (M1'), wherein M1'=$MAC_{m1'}$(x1'). In the embodiment, the first electronic device (401) transmits third information (w3') to a remote electronic device (403) (step 413), wherein the third information (w3') includes the first message authentication code (M1'). In other words, the remote electronic device (403) gets the third information (w3'), wherein the third information (w3') includes the first message authentication code (M1'). The first electronic device (401) calculates a common integer number/value (d'), wherein d'=H2 (A1'∥B1'). The remote electronic device (403) calculates an authentication stage common secret key (e'), wherein e'=$g^{ud'b'} \times g^{a'b'}$, and the authentication stage common secret key (e') may be calculated from (v1$^{d'b'} \times A1^{'b'}$). The remote electronic device (403) calculates a common session secret key (k2') and a message authentication code secret key (m2'), wherein k2'∥m2'=PRF(e'). The remote electronic device (403) calculates a first concatenation (x1'), and verifies that the first message authentication code M1' is equal to $MAC_{m2'}$(x1'), i.e., M1'=$MAC_{m2}$'(x1'). If the result of the verification is a mismatch, the connection will be aborted. The remote electronic device (403) calculates a second public key (B2'), wherein B2'=$A2^{b'}$. The remote electronic device (403) calculates a second concatenation (x2'), calculates a second message authentication code M2', wherein M2'=$MAC_{m2'}$ (x2'), and transmits the second message authentication code (M2') to a first electronic device (401) (step 414). In another embodiment, the remote electronic device (403) uses a common session secret key (k2') to establish a secure channel. It transmits the second public key (B2') and the second cryptographic authentication code (v2) to a first electronic device (401) via the secure channel (step 414). In the embodiment, the remote electronic device (403) transmits fourth information (w4') to a first electronic device (401) (step 414), wherein the fourth information (w4') includes information configured for the first electronic device (401) to get the second message authentication code (M2'), the second public key (B2'), and the second cryptographic authentication code (v2). In step 414, the first electronic device (401) receives the second message authentication code (M2'). In the embodiment, the first electronic device (401) receives the second public key (B2') and the second cryptographic authentication code (v2) (step 414). In other embodiments, the first electronic device (401) further uses a common session secret key (k1') of the first electronic device to establish a secure channel. It uses the secure channel to receive the fourth information (w4'), and gets the second public key (B2') and the second cryptographic authentication code (v2') via the fourth information (w4') (step 414). And, the first electronic device (401) calculates a second concatenation (x2'), and verifies that M2' is equal to $MAC_{m1'}$(x2'), i.e., M2'=$MAC_{m1}$'(x2'). If the result of the verification is a mismatch, the connection will be aborted. The first electronic device (401) calculates a cross-stage message authentication code secret key (h), wherein h=$B2'^{t/r}$=$x^y$. The first electronic device (401) verifies that the second cryptographic authentication code v2 is equal to $MAC_h$(v1)), i.e., v2=$MAC_h$(v1). If the result of the verification is a mismatch, the connection will be aborted.

Fifth Embodiment

Figure 5:
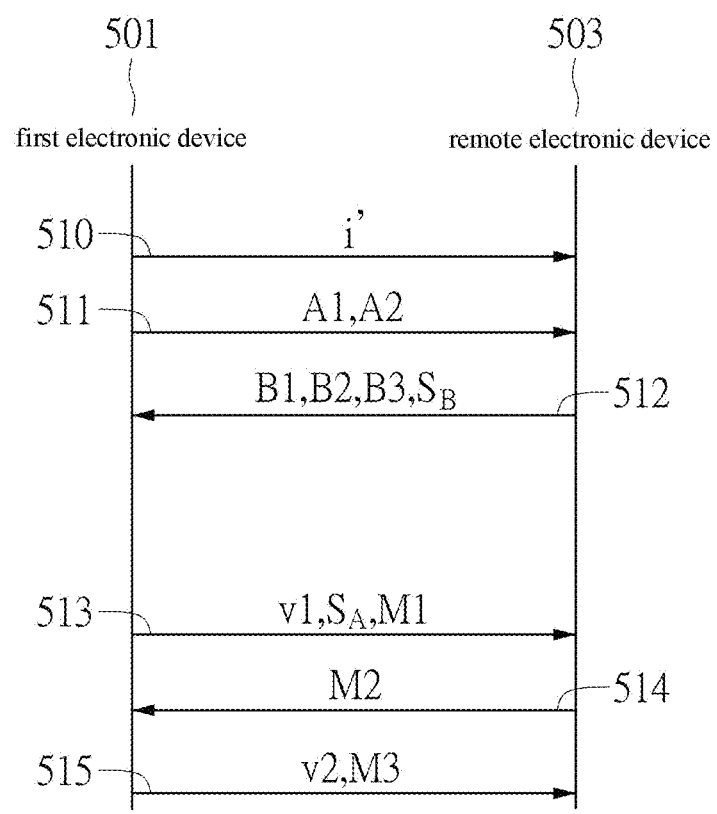
FIG. 5 is a flow chart in a registration stage using signatures.

Please refer to FIG. 5. In the embodiment, second information (w2) (step 512) includes information ($S_B$) related to a signature of a remote electronic device. A mutual dynamic authentication module ($MDA_B$) of the remote electronic device (503) further executes the following: calculating a combined public key (D), wherein the combined public key (D) is a concatenation of a first public key (A1), a second public key (A2), and a first public key (B1), getting a credential ($Cert_B$) and a signature ($Sign_B$(rpid∥H4(D))) from an authentication specific module ($ASM_B$), causing second information (w2) to include information ($S_B$) related to a signature of a remote electronic device (503), wherein the information ($S_B$) related to the signature of the remote electronic device (503) includes the credential ($Cert_B$) and the signature ($Sign_B(rpid\|H4(D))$). The credential ($Cert_B$) includes an anonymous credential or a self-signed credential of a public key ($AKP_B$) of an attestation key pair ($AK_B$) of the remote electronic device, and the credential ($Cert_B$) attests to a verifier that the remote electronic device (503) is a member of a group of trusted devices. The attestation key pair ($AK_B$) of the remote electronic device is generated by an authenticator when it receives a signature request, and the attestation key pair ($AK_B$) is configured for attesting to a verifier that ($MDA_B$) has been authenticated by (RP). The method of attestation is achieved by using a private key ($AKS_B$) of the attestation key pair ($AK_B$) to generate a signature based on the inclusion of the attestation information. The signature ($Sign_B(rpid\|H4(D))$) is generated by using the private key ($AKS_B$) of the attestation key pair ($AK_B$) of the remote electronic device to generate a signature based on an inclusion of ($rpid\|H4(D)$). The mutual dynamic authentication module ($MDA_B$) of the remote electronic device serves as a verifier, and verifies the credential ($Cert_B$) and the signature ($Sign_B(rpid\|H4(D))$). If the verification is qualified, it causes second information (w2) (step 512) to include information ($S_B$) related the signature of the remote electronic device. In an embodiment, the mutual dynamic authentication module ($MDA_B$) of the remote electronic device is further configured to execute the following: getting a direct anonymous attestation group credential ($Cert_S$) (DAA group credential) and a direct anonymous attestation signature ($DAA\text{-}Sign_S(AKP_B)$) (DAA signature) from an authenticator specific module ($ASM_B$) of the remote electronic device; causing second information (w2) to include information ($S_B$) related to a signature of the remote electronic device, wherein the information ($S_B$) related to the signature of the remote electronic device is information related to the signature of the remote electronic device, and the information ($S_B$) related to the signature of the remote electronic device includes ($Cert_S$) and ($DAA\text{-}Sign_S(AKP_B)$). The credential ($Cert_S$) is configured for attesting to a verifier that the remote electronic device is a member of a group of trusted devices, and enabling the verifier to determine that the authenticator is in possession of an uncompromised secret key information from an issuer of the group of trusted devices, and that the secret key information does not reveal any unique authentication information related to the remote electronic device. The ($AKP_B$) is a public key of an attestation key pair ($AK_B$) of the remote electronic device, wherein the attestation key pair ($AK_B$) of the remote electronic device is generated by the authenticator when it receives a signature request. The direct anonymous attestation signature ($DAA\text{-}Sign_S(AKP_B)$) is generated by using a unique signature secret key to generate a direct anonymous attestation signature (DAA signature) based on an inclusion of a public key ($AKP_B$) of an attestation key pair ($AK_B$) of the remote electronic device, wherein a secret key of a member is used to provide the unique signature secret key to attest to a verifier that the authenticity of a remote electronic device without revealing the unique authentication information, and the remote electronic device is a member of a group of trusted devices. A mutual dynamic authentication module ($MDA_B$) of the remote electronic device serves as a verifier, verifies a direct anonymous attestation credential ($Cert_S$), and verifies a direct anonymous attestation signature ($AKP_B$). If the verification is qualified, it causes second information (w2) to include information ($S_B$) related to a signature of the remote electronic device. In an embodiment, information ($S_B$) related to a signature of the remote electronic device includes a credential ($Cert_B$) and a signature ($Sign_B(rpid\|H4(D))$). In an embodiment, information ($S_B$) related to a signature of the remote electronic device includes ($Cert_S$) and ($DAA\text{-}Sign_S(AKP_B)$) of the remote electronic device. In an embodiment, information ($S_B$) related to a signature of the remote electronic device includes ($Cert_S$), ($DAA\text{-}Sign_S(AKP_B)$), and ($Cert_B$) and ($Sign_B(rpid\|H4(D))$) of a remote electronic device.

In the embodiment, third information (w3) (step 513) includes information ($S_A$) related to a signature of a first electronic device. A mutual dynamic authentication module ($MDA_A$) of a first electronic device (501) further executes the following: calculating a combined public key (D), wherein the combined public key (D) is a concatenation of a first public key (A1), a second public key (A2), and a first public key (B1), getting a credential ($Cert_A$) and a signature ($Sign_A(rpid\|H4(D))$) from an authenticator specific module ($ASM_A$), causing third information to include information ($S_A$) related to a signature of the first electronic device (501), wherein the information ($S_A$) related to the signature of the first electronic device includes the credential ($Cert_A$) and the signature ($Sign_A(rpid\|H4(D))$). The credential ($Cert_A$) includes an anonymous credential or self-signed credential of a public key ($AKP_A$) of an attestation key pair ($AK_A$) of the first electronic device, and the credential ($Cert_A$) attests to a verifier that the first electronic device (501) is a member of a group of trusted devices, wherein the attestation key pair ($AK_A$) of the first electronic device is generated by an authenticator when it receives a signature request. The attestation key pair ($AK_A$) is configured for attesting to a verifier that ($MDA_A$) has been authenticated by (RP), and the method of attestation is achieved by using a private key (AKS) of the attestation key pair ($AK_A$) to generate a signature based on the inclusion of attestation information. The signature ($Sign_A(rpid\|H4(D))$) is generated by using a private key (AKS) of an attestation key pair ($AK_A$) of a first electronic device based on the inclusion of ($rpid\|H4(D)$). A mutual dynamic authentication module ($MDA_A$) of a first electronic device serves as a verifier, and verifies a credential ($Cert_B$) and a signature ($Sign_B(rpid\|H4(D))$) of a remote electronic device (503). If the result of the verification is a match, it transmits third information (w3) (step 513). If the result of the verification is a mismatch, the connection will be aborted. In an embodiment, the mutual dynamic authentication module ($MDA_A$) of the first electronic device further executes the following: getting a direct anonymous attestation group credential ($Cert_C$) (DAA group credential) and a direct anonymous attestation signature ($DAA\text{-}Sign_C(AKP_A)$) (DAA signature) from an authenticator specific module ($ASM_A$) of the first electronic device; causing third information (w3) to include information ($S_A$) related to a signature of the first electronic device, wherein the information ($S_A$) related to the signature of the first electronic device is information related to the signature of the first electronic device. The information ($S_A$) related to the signature of the first electronic device includes ($Cert_C$) and ($DAA\text{-}Sign_C(AKP_A)$). The credential ($Cert_C$) is configured for attesting to a verifier that the first electronic device is a member of a group of trusted devices, and enabling the verifier to determine that an authenticator is in possession of an uncompromised secret key information from an issuer of the group of trusted devices, and that the secret key information does not reveal any unique authentication information related to the first electronic device. The ($AKP_A$) is a public key of an attestation key pair ($AK_A$) of a first electronic device, wherein the attestation key pair ($AK_A$) of the first electronic device is generated by the authenticator when it receives a signature request. The direct anonymous attestation signature (DAA-$Sign_C$($AKP_A$)) is generated by using a unique signature secret key to generate a direct anonymous attestation signature (DAA signature) based on the inclusion of a public key ($AKP_A$) of an attestation key pair ($AK_A$) of a first electronic device, wherein a secret key of a member is used to provide the unique signature secret key to attest to a verifier that the authenticity of the first electronic device without revealing the unique authentication information, and the first electronic device is a member of the group of trusted devices. A mutual dynamic authentication module ($MDA_A$) of the first electronic device serves as a verifier, verifies a direct anonymous attestation credential ($Cert_S$) of the remote electronic device, and verifies a direct anonymous attestation signature (DAA-$Sign_S$ ($AKP_B$)). If the result of the verification is a match, it transmits third information (w3) (step 513). If the result of the verification is a mismatch, the connection will be aborted. In an embodiment, information ($S_A$) related to a signature of the first electronic device includes ($Cert_A$) and a signature ($Sign_A$(rpid∥H4(D))). In an embodiment, information ($S_A$) related to a signature of the first electronic device includes ($Cert_C$) and (DAA-$Sign_C$($AKP_A$)) of the first electronic device. In an embodiment, information ($S_A$) related to a signature of the first electronic device includes ($Cert_C$), (DAA-$Sign_C$($AKP_A$))), ($Cert_A$), and ($Sign_A$(rpid∥H4 (D))) of the first electronic device.

Sixth Embodiment

Figure 6:
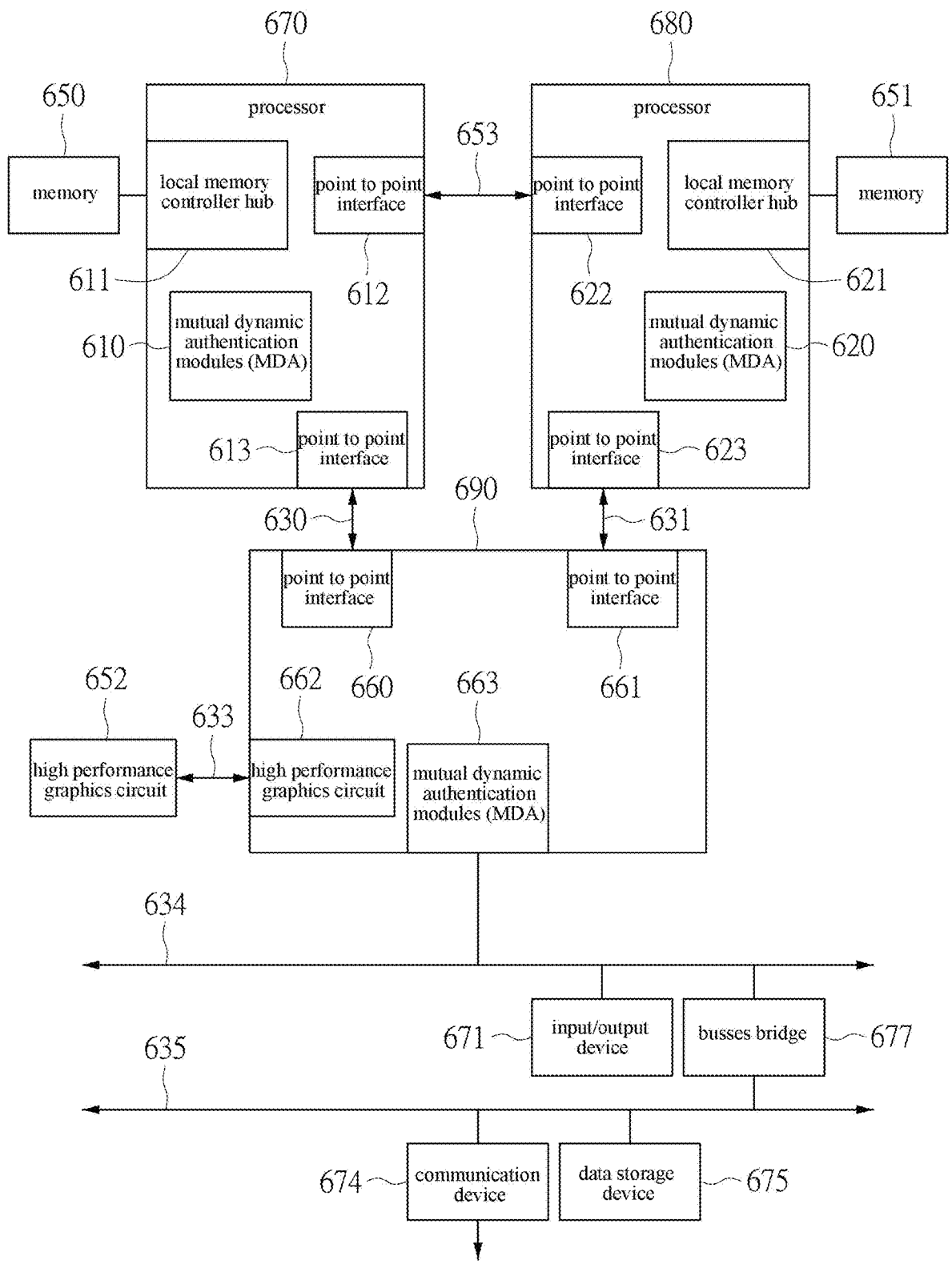
FIG. 6 is a schematic diagram of a system for authentication.

Please refer to FIG. 6. FIG. 6 illustrates a system including processors, memories, chipsets, and input/output devices interconnected via multiple point to point interfaces. The system of FIG. 6 further includes a large number of processors, and for clarity purposes, only two processors (670, 680) are shown. Processors (670, 680) include local memory controller hubs (611, 621) connected to memories (650, 651). Processors (670, 680) may exchange data using point to point interfaces (612, 622) via a channel (653). Processors (670, 680) may use point to point interfaces (613, 623, 660, 661), and via other point to point channels (630, 631) to exchange data with chipsets (690). Chipsets (690) may use high performance graphics interface (662) and via a point to point channel (633) to exchange data with high performance graphics circuits (652). In an embodiment, they may be coupled to a computer bus (634 or 635), or inside chipsets (690), or coupled to a data storage device (675), or coupled to memories (650, 651), or establish a channel with another system via a communication device (674). In an embodiment, mutual dynamic authentication modules (MDA) (610, 620) are inside processors (670, 680), respectively. Via point to point interfaces (612, 622), a processor (670) and a processor (680) may support mutual dynamic authentication. In another embodiment, a mutual dynamic authentication module (MDA) (663) may perform mutual dynamic authentication with an external device via a communication device (674). In an embodiment, mutual dynamic authentication modules (MDA) (610, 620, 663) may enable mutual dynamic authentication between chipsets (690) and processors (670, 680) via point to point interfaces (613, 623, 660, 661). In an embodiment, the system of FIG. 6 further includes input/output devices (671), busses bridges (677), other circuits, logic units, or devices inside the system, which are not shown in the figure. In other embodiments, the disclosure may be dispersed throughout the plurality of circuits, or logic units, or devices in FIG. 6. With respect to the system in the embodiment, the present disclosure is not limited to described embodiments, but may be modified and changed within the spirit and scope of the appended claims. For example, it is to be understood that the disclosure is applicable to all types of semiconductor integrated circuit (IC) chips. Examples of such IC chips include, but are not limited to, a processor, or a controller, or a chipset component, or a programmable logic array (PLA), or a memory chip, or a network chip, etc.

Seventh Embodiment

Figure 7:
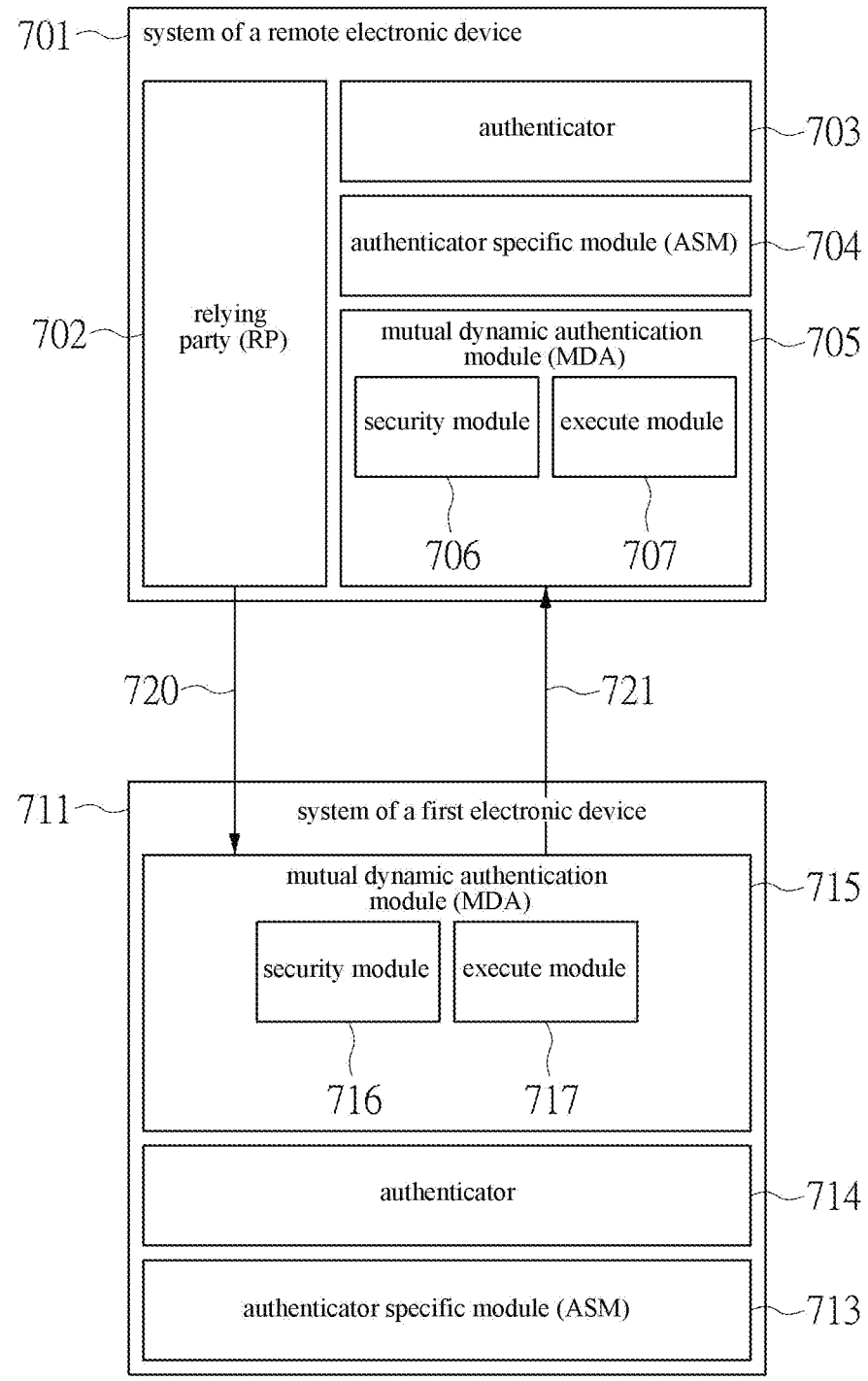
FIG. 7 is a schematic diagram of a system for authentication between devices.

Please refer to FIG. 7. In the embodiment, a first step is authentication (720), and a second step is mutual dynamic authentication (721). A relying party (RP) (702) performs authentication (720) on a mutual dynamic authentication module ($MDA_A$) (715), wherein the relying party (RP) (702) is a part of a system (701) of a remote electronic device. In other embodiments, the relying party (RP) (702) is a third party (not shown), independent from a system (711) of a first electronic device and the system (701) of the remote electronic device. In the embodiment, the authentication (720) is to establish a TLS channel between the relying party (RP) (702) and the system (711) of the first electronic device, and the system (711) of the first electronic device downloads the mutual dynamic authentication module ($MDA_A$) (715) via the TLS channel. In an embodiment, the authentication (720) is that the relying party (RP) signs a mutual dynamic authentication module ($MDA_A$) (715), and then the mutual dynamic authentication module ($MDA_A$) (715) and the signature are installed to the system (711) of the first electronic device. Implementations of the mutual dynamic authentication module ($MDA_A$) (715) and the mutual dynamic authentication module ($MDA_B$) (705) may be, but are not limited to, hardware electronic circuits, or digital logic chips, or firmwares, or softwares, or browsers, or browser scripts, etc. The system (711) of the first electronic device and the system (701) of the remote electronic device further include execution environments (not shown in the figure) of the mutual dynamic authentication modules (MDA) (715, 705). The mutual dynamic authentication (721) includes a registration stage and an authentication stage. The system (711) of the first electronic device initiates the mutual dynamic authentication (721) with the system (701) of the remote electronic device, and the system (701) of the remote electronic device responds (721) to the mutual dynamic authentication (721). The method of initiating and responding includes:

Requirement 1. Using a system (711) of the first electronic device to initiate (721) a registration with a system (701) of the remote electronic device, for registering an identity belonging to the system (711) of the first electronic device with the system (701) of the remote electronic device.

Requirement 2. Using a system (701) of the remote electronic device system to respond (721) to a system (711) of the first electronic device system initiating registration with the system (701) of the remote electronic device, for registering an identity belonging to the system (701) of the remote electronic device with the system (711) of the first electronic device.

Requirement 3. Using a system (711) of the first electronic device to initiate (721) in a mutual authentication between the system (711) of the first electronic device and a system (701) of the remote electronic device, for attesting to the system (701) of the remote electronic device an identity belonging to the system (711) of the first electronic device, and for authenticating an identity of the system (701) of the remote electronic device.

Requirement 4. Using a system (701) of the remote electronic device to respond (721) to a system (711) of the first electronic device initiating a mutual authentication between the system (711) of the first electronic device and the system (701) of the remote electronic device, for attesting to the system (711) of the first electronic device an identity belonging to the system (701) of the remote electronic device, and for authenticating an identity belonging to the system (711) of the first electronic device.

Authenticator specific modules (713, 704) provide standard communication interfaces between authenticators (714, 703) and mutual dynamic authentication modules (715, 705). Members of a group of trusted devices would have authenticators (714, 703) with the same model. The authenticator specific modules (713, 704) transmit to authenticators (714, 703) whether the mutual dynamic authentication modules (MDA) (715, 705) have been authenticated by a relying party (RP) (702), and an identifier (rpid) of the relying party (RP) (702), including whether the execution environments (not shown in the figure) of the mutual dynamic authentication modules (MDA) (715, 705) meet standards. In the embodiment, the registration stage and the authentication stage respectively have a request (721) and a response (721). Requirements are the following:

Requirement 1. Using a system (711) of the first electronic device to initiate (721) a registration with a system (701) of the remote electronic device, for registering an identity belonging to the system (711) of the first electronic device with the system (701) of the remote electronic device, the steps of which includes:
  using an execute module (717) to calculate a second cryptographic authentication code (v2);
  using a security module (716) to secure first information (w1) and second information (w2) from being tampered with by a middleman;
  wherein the first information (w1) is sent to the system (701) of the remote electronic device;
  wherein the first information (w1) includes a first public key (A1) of the system (711) of the first electronic device and a second public key (A2) of the system (711) of the first electronic device;
  wherein the second information (w2) is received from the system (701) of the remote electronic device;
  wherein the second information (w2) includes a first public key (B1) of the system (701) of the remote electronic device and a second public key (B2) of the system (701) of the remote electronic device in a registration stage;
  wherein calculating a second cryptographic authentication code (v2) includes:
  calculating a cross-stage authentication code secret key (h) based on a second public key (B2) of the system (701) of the remote electronic device; and
  calculating a message authentication code as the second cryptographic authentication code (v2) by using the cross-stage authentication code secret key (h) as a message authentication code secret key and a first cryptographic authentication code (v1) as information to be authenticated;
  wherein securing first information (w1) and second information (w2) from being tampered with by a middleman includes:
  calculating a one-way function of a cross-stage secret key (u) of the system (711) of the first electronic device as a first cryptographic authentication code (v1);
  receiving the second information (w2), and sending third information (w3);
  wherein the third information (w3) is sent to the system (701) of the remote electronic device;
  wherein the third information (w3) includes the first cryptographic authentication code (v1); and
  receiving fourth information (w4), and sending fifth information (w5);
  wherein the fourth information (w4) is received from the system (701) of the remote electronic device;
  wherein the fifth information (w5) is sent to the system (701) of the remote electronic device;
  wherein the fifth information (w5) includes the second cryptographic authentication code (v2).

Requirement 2. The method as described in the Requirement 1, includes:
  using a system (701) of the remote electronic device to respond (721) to a system (711) of the first electronic device initiating a registration with the remote electronic device, the steps of which include:
  using an execute module (707) to verify whether the system (711) of the first electronic device is in possession of a cross-stage secret key (u) of the system (711) of the first electronic device;
  using a security module (706) to secure first information (w1) and second information (w2) from being tampered with by a middleman;
  wherein the first information (w1) is received from the system (711) of the first electronic device;
  wherein the first information (w1) includes a first public key (A1) of the system (711) of the first electronic device and a second public key (A2) of the system (711) of the first electronic device;
  wherein the second information (w2) is sent to the system (711) of the first electronic device;
  wherein the second information (w2) includes a first public key (B1) of the system (701) of the remote electronic device and a second public key (B2) of the system (701) of the remote electronic device;
  wherein verifying whether the system (711) of the first electronic device is in possession of a cross-stage secret key (u) of the system of the first electronic device comprising:
  receiving first information (w1), wherein the first information (w1) includes a first public key (A1) and a second public key (A2);
  using the second public key (A2) to calculate a one-way function of a cross-stage secret key (y) of the system (701) of the remote electronic device as the second public key (B2);
  responding to the first information (w1), and sending the second information (w2) to the first electronic device, wherein the second information (w2) includes the first public key (B1) and the second public key (B2);
  receiving a first cryptographic authentication code (v1) from the system (71) of the first electronic device, wherein the first cryptographic authentication code (v1) is a one-way function of a cross-stage secret key (u) of the system (711) of the first electronic device; and
  using the first cryptographic authentication code (v1) to verify whether the system (711) of the first electronic device is in possession of the cross stage secret key (u) of the system (711) of the first electronic device;

wherein securing first information (w1) and second information (w2) from being tampered with by a middleman includes:
receiving a second cryptographic authentication code (v2) from the system (711) of the first electronic device; and
storing information so that a first cryptographic authentication code (v1) related to the system (711) of the first electronic device, a second cryptographic authentication code (v2) related to the system (711) of the first electronic device, and a cross-stage secret key (y) related to the system (711) of the first electronic device are retrievable across stages.

Requirement 3. The method as described in the Requirement 1, includes:
using a system (711) of the first electronic device to initiate (721) a mutual authentication between the first electronic device and the remote electronic device, the steps of which include:
using an execute module (717) to verify whether a second cryptographic authentication code (v2) is a message authentication code of a first cryptographic authentication code (v1);
using a security module (716) to securing first information (w1') and second information (w2') from being tampered with by a middleman;
wherein the first information (w1') is sent to a system (701) of the remote electronic device;
wherein the first information (w1') includes a first public key (A1') of the system (711) of the first electronic device and a second public key (A2') of the system (711) of the first electronic device;
wherein the second information (w2') is received from the system (701) of the remote electronic device;
wherein the second information (w2') includes a first public key (B1') of the system (701) of the remote electronic device;
wherein verifying whether a second cryptographic authentication code (v2) is a message authentication code of a first cryptographic authentication code (v1) includes:
calculating a cross-stage message authentication code secret key (h) based on a second public key (B2') of the system (701) of the remote electronic device; and
calculating a message authentication code by using the cross-stage authentication code secret key (h) as a message authentication code secret key and a first cryptographic authentication code (v1) as information to be authenticated, and verifying that the message authentication code matches a second cryptographic authentication code (v2);
wherein securing first information (w1') and the second information (w2') from being tampered with by a middleman includes:
receiving second information (w2'), and sending third information (w3');
wherein the third information (w3') is sent to the system (701) of the remote electronic device;
wherein the third information (w3) includes a proof to the system (701) of the remote electronic device that the first electronic device is in possession of a cross-stage secret key (u); and
receiving fourth information (w4');
wherein the fourth information (w4') is received from the system (701) of the remote electronic device;
wherein the fourth information (w4') includes a second public key (B2') of the remote electronic device and a second cryptographic authentication code (v2).

Requirement 4. The method as described in the Requirement 1, includes:
using a system (701) of the remote electronic device to respond (721) to a system (711) of the first electronic device initiating a mutual authentication between the system (711) of the first electronic device and the system (701) of the remote electronic device, the steps of which include:
using an execute module (707) to verify whether the system (711) of the first electronic device is in possession of a cross-stage secret key (u) of the system (711) of the first electronic device;
using a security module (706) to secure first information (w1') and second information (w2') from being tampered with by a middleman;
wherein, the first information (w1') is received the system (711) of the first electronic device;
wherein the first information (w1') includes a first public key (A1') of the system (711) of the first electronic device and a second public key (A2') of the system (711) of the first electronic device;
wherein, the second information (w2') is sent to the system (711) of the first electronic device;
wherein, the second information (w2') includes a first public key (B1') of the system (701) of the remote electronic device;
wherein, verifying whether the system (711) of the first electronic device is in possession of a cross-stage secret key (u) of the system (711) of the first electronic device includes:
using stored information, so that a first cryptographic authentication code (v1) related to the system (711) of the first electronic device and a second cryptographic authentication code (v2) of the system (711) of the first electronic device and a cross-stage secret key (y) related to the system (711) of the first electronic device are retrieved;
receiving first information (w1'), wherein the first information (w1') includes a first public key (A1') and a second public key (A2');
responding to the first information (w1'), and sending second information (w2') to the system (711) of the first electronic device, wherein the second information (w2') includes a first public key (B1');
using a first cryptographic authentication code (v1) to verify whether a system (711) of the first electronic device is in possession of a cross-stage secret key (u) of the system (711) of the first electronic device;
wherein securing first information (w1') and second information (w2') from being tampered with by a middleman includes:
sending a second public key (B2') and a second cryptographic authentication code (v2) to the system (711) of the first electronic device.

Requirement 5. A system (701) of a remote electronic device, includes:
a mutual dynamic authentication module (MDA) (705) configured to perform the method according to the Requirement 2; and
a memory (not shown in the figure) configured to store secret key information.

Requirement 6. The system (701) of the remote electronic device as described in the Requirement 5, further includes:
an authenticator (703) configured to enable a verifier (not shown in the figure) to determine that the authenticator (703) is in possession of secret key information from an issuer of a group of trusted devices, and that the secret key information does not reveal any unique authentication information related to the remote electronic device; and an authenticator specific module (ASM) (704) configured to provide a standard communication interface of the authenticator (703);

wherein the mutual dynamic identity authentication module (MDA) (705) according to the Requirement 5, further configured to:

calculate a combined public key (D), wherein the combined public key includes a concatenation of the first public key (A1) of the system (711) of the first electronic device, the second public key (A2) of the system (711) of the first electronic device, and the first public key (B1) of the system of the remote electronic device according to the method of the Requirement 2;

send the combined public key (D) to the authenticator specific module (ASM) (704), and receive a credential and a signature from the authenticator specific module (ASM) (704);

wherein, the authenticator specific module (ASM) (704) is a standard communication interface between the mutual dynamic authentication module (MDA) (705) and the authenticator;

wherein, the credential attests to the verifier (not showin in figure) that a member public key (AKP) is a public key of a member belonging a group of trusted devices; the member public key (AKP) is a public key of an attestation key pair (AK); the signature is generated by using a private key (AKS), and based on an inclusion of the combined public key (D); and the private key (AKS) is a private key of the attestation key pair (AK);

wherein, the second information (w2) according to the method of the Requirement 2, further includes information ($S_B$) related to the signature of the remote electronic device, wherein the information ($S_B$) related to the signature of the remote electronic device includes the credential and the signature.

Requirement 7. The mutual dynamic authentication module (MDA) (705) as described in the Requirement 6, is further configured to:

send an identifier (rpid) of a relying party (RP) to the authenticator specific module (ASM) (704), and receiving a credential and a signature from the authenticator specific module (ASM) (704);

wherein, the relying party (RP) (702) is configured to authenticate (not shown in the figure) the mutual dynamic authentication module (MDA) (705); and wherein, the signature is generated by using a private key (AKS), and based on an inclusion of the identifier (rpid).

Requirement 8. The mutual dynamic authentication module (MDA) (705) according to the Requirement 5, is further configured to perform the method of the Requirement 4.

Requirement 9. A system of a first electronic device, includes:

a mutual dynamic authentication module (MDA) (715) configured to perform the method of the Requirement 1.

Requirement 10. The system (711) of the first electronic device as described in the Requirement 9, further includes:

an authenticator (714) configured to enable a verifier (not shown in the figure) to determine that the authenticator (714) is in possession of secret key information from an issuer of a group of trusted devices, and that the secret key information does not reveal any unique authentication information related to the first electronic device; and an authenticator specific module (ASM) (713) configured to provide a standard communication interface of the authenticator (714);

wherein the mutual dynamic authentication module (MDA) (715) as described in the Requirement 9, is further configured to:

calculate a combined public key (D), wherein the combined public key (D) includes a concatenation of a first public key (A1) of the system (711) of the first electronic device, a second public key (A2) of the system (711) of the first electronic device, and a first public key (B1) of the system (701) of the remote electronic device according to a method of the Requirement 1; and send the combined public key (D) to the authenticator specific module (ASM) (713), and receive a credential and a signature from the authenticator specific module (713);

wherein the authenticator specific module (ASM) (713) is a standard communication interface between the mutual dynamic authentication module (MDA) (715) and the authenticator (714);

wherein, the credential attests to the verifier (not shown in the figure) that a member public key (AKP) is a public key of a member belonging to a group of trusted devices, and the member public key (AKP) is a public key of an attestation key pair (AK); the signature is generated by using a private key (AKS), based on an inclusion of the combined public key (D); and the private key (AKS) is a private key of the attestation key pair (AK);

wherein, the third information (w3) according to the method of the Requirement 1, further includes information ($S_A$) related to the signature of the first electronic device, and the information ($S_A$) related to the signature of the first electronic device includes the credential and the signature.

Requirement 11. The mutual dynamic authentication module (MDA) (715) as described in the Requirement 10, is further configured to:

send an identifier (rpid) of a relying party (RP) (702) to the authenticator specific module (ASM) (713), and receive a credential and a signature from the authenticator specific module (ASM) (713);

wherein, the relying party (RP) (702) is configured to authenticate (720) the mutual dynamic authentication module (MDA) (715); and wherein, the signature is generated by using a private key (AKS), based on an inclusion of the identifier (rpid).

Requirement 12. The mutual dynamic authentication module (MDA) (715) as described in the Requirement 9, is further configured to perform the method of the Requirement 3.

Eighth Embodiment

Figure 8:
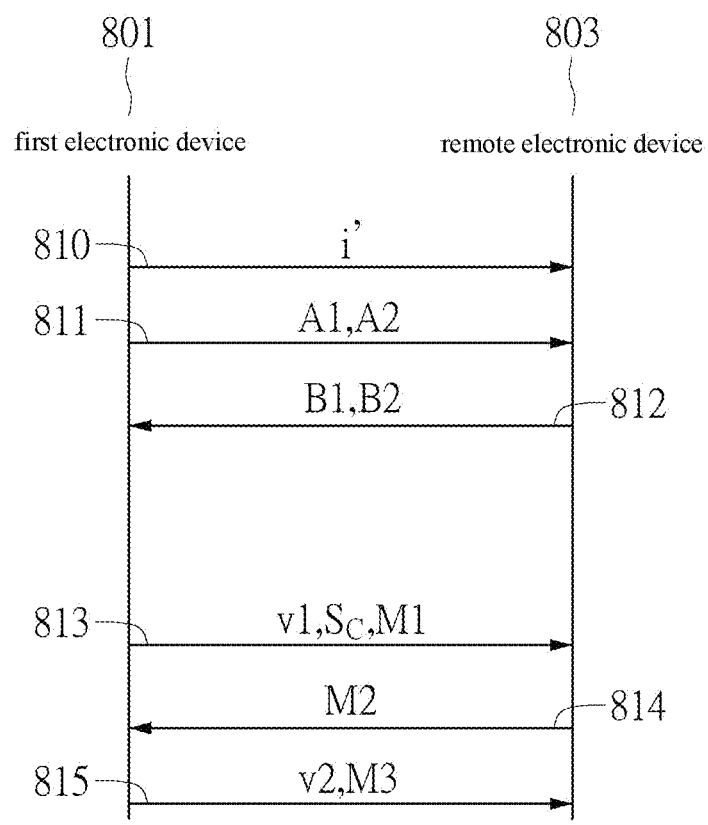
FIG. 8 is a flow chart in a registration stage using signatures.

Please refer to FIG. 8. In the embodiment, a first electronic device (801) gets an identity (i) and an element password (x), generates a first public key (A1); generates a temporary private key (r); uses the element password (x) to calculate a one-way function of the temporary private key (r) as a second public key (A2); and, the first electronic device (801) transmits first information (w1) to a remote electronic device (803) (step 811), wherein the first information (w1)

includes the first public key (A1) and the second public key (A2). In the embodiment, the remote electronic device (803) generates a first public key (B1); generates a cross-stage secret key (y); and, uses the second public key (A2) of the first electronic device (801) to calculate a one-way function of the cross-stage secret key (y) as a second public key (B2); and, the remote electronic device (803) transmits second information (w2) to the first electronic device (801) (step 812), wherein the second information (w2) includes the first public key (B1) and the second public key (B2). An authenticator of the first electronic device (801) generates a pair of a public key and private key, wherein the public key is a first cryptographic authentication code (v1), and the private key is a cross-stage secret key (u) of the first electronic device corresponding to the first cryptographic authentication code (v1). The first electronic device (801) stores the cross-stage secret key (u). The private key (u) is specific to the identity (i). Further, the first electronic device (801) transmits third information (w3) to the remote electronic device (803) (step 813), wherein the third information (w3) includes a signature ($S_C$) and a first message authentication code (M1). The signature ($S_C$) is generated by using the cross-stage secret key (u) based on the inclusion of a combined public key (D) and an identifier (rpid) of a relying party. The remote electronic device (803) receives the third information (w3). In addition, in another embodiment, the remote electronic device (803) verifies the credential and the signature ($S_C$). If the result of the verification is a mismatch, the connection will be aborted. The remote electronic device (803) transmits fourth information (w4) to the first electronic device (801) (step 814), wherein the fourth information (w4) includes a second message authentication code (M2). In other words, the first electronic device (801) receives the fourth information (w4), wherein the fourth information (w4) includes the second message authentication code (M2). In an embodiment, the first electronic device (801) verifies the second message authentication code (M2). If the result of the verification is a mismatch, the connection will be aborted. In other embodiments, the first electronic device (801) calculates a cross-stage message authentication code secret key (h), wherein $h=B2^{1/r}=x^y$, and calculates a second cryptographic authentication code v2, wherein $v2=MAC_h$(v1). The first electronic device (801) uses a common session secret key (k1) to establish a secure channel, and uses the secure channel to transmit fifth information (w5) to the remote electronic device (803) (step 815). The fifth information (w5) includes information that enables the remote electronic device (803) to get the second cryptographic authentication code (v2) and a third message authentication code (M3), wherein the third message authentication code (M3) is configured for authenticating that the fifth information (w5) is from the first electronic device (801). In an embodiment, the remote electronic device (803) verifies the third message authentication code (M3). If the result of the verification is a match, it stores information so that an identifier (i') and a first cryptographic authentication code (v1) related to an identifier (i') and a second cryptographic authentication code (v2) related to an identifier (i') are retrievable across stages.

Ninth Embodiment

Figure 9:
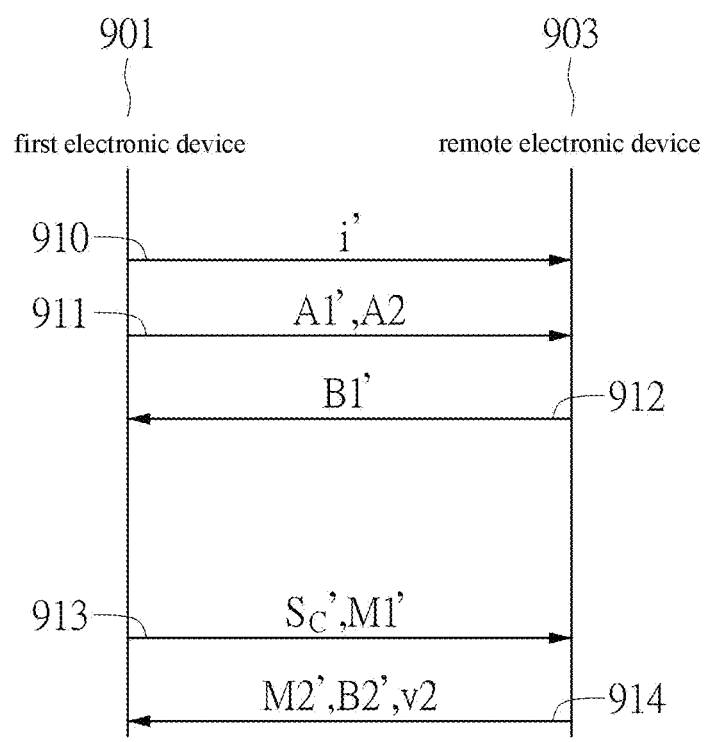
FIG. 9 is a flow chart in an authentication stage using signatures.

Please refer to FIG. 9. In the embodiment, a first electronic device (901) gets an identity (i) and an element password (x); generates a first public key (A1'); generates a temporary private key (r'); and uses the element password (x) to calculate a one-way function of the temporary private key (r') as a second public key (A2'). And, the first electronic device (901) transmits first information (w1') to a remote electronic device (903) (step 911), wherein the first information (w1') includes the first public key (A1') and the second public key (A2'). The remote electronic device (903) generates a first public key (B1'); and the remote electronic device (903) transmits second information (w2') to the first electronic device (901) (step 912), wherein the second information (w2') includes a first public key (B1'). In the embodiment, an authenticator (not shown in the figure) of the first electronic device (901) gets a cross-stage secret key (y) of the first electronic device based on an identity (i), and calculates a one-way function of a cross-stage secret key (u) as a first cryptographic authentication code (v1). Further, the first electronic device (901) transmits third information (w3') to the remote electronic device (903) (step 913), wherein the third information (w3') includes a signature ($S_C'$) and a first information authentication code (M1'). The signature ($S_C'$) is generated by using the cross-stage secret key (u) of the first electronic device, based on the inclusion of a combined public key (D') and an identifier (rpid) of a relying party. The remote electronic device (903) receives the third information (w3'). In addition, in another embodiment, the remote electronic device (903) further verifies the credential and the signature ($S_C'$). If the result of the verification is not a match, the connection will be aborted. The remote electronic device (903) transmits fourth information (w4') to the first electronic device (901) (step 914), wherein the fourth information (w4') includes a second public key (B2') and a second cryptographic authentication code (v2) and a message information authentication code (M2'). In other words, the first electronic device (901) receives the fourth information (w4'), wherein, the fourth information (w4') includes the second public key (B2') and the second cryptographic authentication code (v2) and the second message authentication code (M2'). In an embodiment, the first electronic device (901) verifies the second message authentication code (M2'). If the result of the verification is not a match, the connection will be aborted. In other embodiments, the first electronic device (901) calculates a cross-stage authentication code secret key (h), i.e., $h=B2^{1/r'}=x^y$, and calculates (v2), wherein $v2=MAC_h$(v1). The first electronic device (901) verifies whether the second cryptographic authentication code (v2) in the fourth information (w4') matches with $MAC_h$(v1).

Tenth Embodiment

Please refer to FIG. 4. In the embodiment, first, a first electronic device (401) transmits first information (w1') to a remote electronic device (403) (step 411), wherein the first information (w1') includes a first public key (A1') and a second public key (A2') of the first electronic device (401). The remote electronic device (403) gets the first information (w1'), wherein the first information (w1') includes the first public key (A1') and the second public key (A2'). The remote electronic device (403) transmits second information (w2') to the first electronic device (401) (step 412), wherein the second information (w2') includes a first public key (B1') of the remote electronic device (403). The first electronic device (401) calculates an authentication stage common secret key (e'), wherein $e'=g^{ud'b'} \times g^{a'b'}$. In addition, in another embodiment, the first electronic device (401) calculates an authentication stage common secret key (e'), wherein $e'=g^{a'b'}$. The remote electronic device (403) calculates an authentication stage common secret key (e'), wherein $e'=g^{ud'b'} \times g^{a'b'}$. In addition, in another embodiment, the remote electronic device (403) calculates an authentication stage common secret key (e'), wherein $e'=g^{a'b'}$. The remote electronic device (403) transmits fourth information (w4') to the first electronic device (401) (step 414), wherein the fourth information (w4') includes information that enables the first electronic device (401) to get a second message authentication code (M2'), a second public key (B2'), and a second cryptographic authentication code (v2). The first electronic device (401) calculates a cross-stage message authentication code secret key (h), wherein $h=B2'^{u/r'}=x^y$. The first electronic device (401) verifies that the second cryptographic authentication code v2 is equal to $MAC_h(v1)$, i.e., $v2=MAC_h(v1)$. If the result of the verification is not a match, the connection will be aborted.

If a middleman impersonates a remote electronic device (403), from the perspective of the middleman, (b') is known. If the first electronic device (401) calculates an authentication stage common secret key e' is equal to $B1'^{ud'} \times B1'^{a'}$ and equal to $B1'^{ud'} \times A1'^{b'}$, i.e., $e'=B1'^{ud'} \times B1'^{a'} = B1'^{ud'} \times A1'^{b'}$, a middleman may try every (u') until breaking (u'). It is called a dictionary attack.

In the embodiment, the remote electronic device (403) calculates a first public key (B1') of the remote electronic device (403), wherein $B1'=g^{b'} \times g'^{v1}$, and B1' is an element of a nilpotent group. The remote electronic device (403) transmits second information (w2') to the first electronic device (401) (step 412), wherein the second information (w2') includes the first public key (B1'). The first electronic device (401) calculates an authentication stage common secret key (e'), wherein $e'=g^{ud'b'} \times g^{a'b'}$, and the authentication stage common secret key (e') may be calculated from $(B1'/g'^{v1})^{ud'} \times (B1'/g'^{v1})^{a'}$. In addition, in another embodiment, the first electronic device (401) calculates an authentication stage common secret key (e'), wherein $e'=g^{a'b'}$, and the authentication stage common secret key (e') may be calculated from $(B1'/g'^{v1})^{a'}$. The remote electronic device (403) calculates an authentication stage common secret key (e'), wherein $e'=g^{ud'b'} \times g^{a'b'}$, and the authentication stage common secret key (e') may be calculated from $v1_{d'b} \times A1'^{b'}$. In addition, in another embodiment, the remote electronic device (403) calculates an authentication stage common secret key (e'), wherein $e'=g^{a'b'}$, and the authentication stage common secret key (e') may be calculated from $A1'^{b'}$, wherein (g) and (g') are elements of a group (N). A group generated by (g) is a group (L). A group generated by (g') is a group (L'). A group (L) and a group (L') are not the same. (q) is the number of elements of the group (L). (q) is also the number of elements of the group (L'). (q) is prime. (N) is a nilpotent group. Every element of the group (N), taken to the power of (q), equals to an identity element. The calculation of (g'v1) includes first mapping a first cryptographic authentication code (v1) to an integer number/value, and calculating (g') to the power of (v1). A method of mapping (v1) to an integer number/value, is representing (v1) to a string, representing the string to a binary number, and mapping the binary number to an integer number/value from (0) to (q−1).

If a middleman proceeds to attack, it may impersonate a remote electronic device (403), transmits its own second information (w2') to a first electronic device (401) (step 412), wherein the second information (w2') includes the middleman's own first public key (B1'). That is, in the meantime, the middleman has replaced a first public key (B1') of original remote electronic device (403). Since the first electronic device (403) does not know that the remote electronic device (403) has been impersonated by a middleman, the first electronic device (401) proceeds to transmit third information (w3') to the remote electronic device (403) which has been impersonated by a middleman (step 413). The third information (w3') includes a first message authentication code (M1'). In other words, the middleman may get the third information (w3'), wherein the third information (w3') includes the first message authentication code (M1'). Since the first message authentication code (M1') is a function of an authentication stage common secret key (e'), and the authentication stage common secret key (e') is a function of $((B1'/g'^{v1})^{a'})$, the middleman may need to try every combination of (v1a') when performing a dictionary attack. However, (A1') is a one-way function of (a'), and the middleman cannot deduce (a') from (A1'), so it is not easy for the middleman to infer (u').

As a result, a first public key (B1') of a remote electronic device (403) is an element of a nilpotent group, which may result in a mitigation of a dictionary attack.

In the embodiment, a method of mutual authentication between a remote electronic device (403) and a first electronic device (401) includes the steps of initiating the method of mutual authentication by a first electronic device (401). In step 412, it receives second information (w2'), wherein the second information (w2') includes a first public key (B1') of a remote electronic device (403). The first public key (B1') of the remote electronic device (403) is an element of a nilpotent group (N). Following a reception of the second information (w2'), it calculates (e'), wherein $e'=g^{ud'b'} \times g^{a'b'}=(B1'/g'^{v1})^{ud'} \times (B1'/g'^{v1})^{a'}$. In addition, in another embodiment, following a reception of the second information (w2'), it calculates (e'), wherein $e'=g^{a'b'}=(B1'/g'^{v1})^{a'}$.

In the embodiment, in the method of mutual authentication between the remote electronic device (403) and the first electronic device (401), the remote electronic device (403) responds to the first electronic device (401). The steps of the method of mutual authentication include: calculating a first public key (B1') of the remote electronic device (403), wherein $B1'=g^{b'} \times g'^{v1}$, and transmitting second information (w2') in (step 412), wherein the second information (w2') includes the first public key (B1') of the remote electronic device (403), and the first public key (B1') of the remote electronic device (403) is an element of a nilpotent group (N).

In the embodiment, the remote electronic device (403) is characterized in including a mutual dynamic authentication module (MDA) configured to transmit second information (w2') in (step 412), wherein the second information (w2') includes a first public key (B1') of the remote electronic device (403), and the first public key (B1') of the remote electronic device (403) is an element of a nilpotent group (N). The mutual dynamic authentication module (MDA) is characterized in that calculating (B1'), wherein $B1'=g^{b'} \times g'^{v1}$.

In the embodiment, a first electronic device (401) is characterized in including a mutual dynamic authentication module (MDA) configured to receive second information (w2') in (step 412), wherein the second information (w2') includes a first public key (B1') of the remote electronic device, and the first public key (B1') of the remote electronic device (403) is an element of a nilpotent group (N). The mutual dynamic authentication module (MDA) is characterized in calculating (e'), wherein $e'=g^{ud'b'} \times g^{a'b'}=(B1'/g'^{v1})^{ud'} \times (B1'/g'^{v1})^{a'}$. In addition, in another embodiment of the first electronic device, the mutual dynamic authentication module (MDA) is characterized in calculating (e'), wherein $e'=g^{a'b'}=(B1'/g'^{v1})^{a'}$.

A first public key (B1') of a remote electronic device (403) is an element of a nilpotent group (N), characterized in security aspects, including:

Requirement 1. It requires mapping an element of a group (L) to an element of a parent group (N) of a group (L).

Requirement 2. It requires mapping a group (L) to its codomain, wherein the codomain is a set of right cosets.

Requirement 3. It requires that a set of right cosets is closed under multiplication. Under the condition, a subgroup (L) is a normal subgroup of a set of right cosets. That is, the number of elements of a normalizer of a subgroup (L) is larger than the number of elements of a subgroup (L), which is (q).

Requirement 4. It requires that the number of elements of a normalizer of every proper subgroup of a parent group (N) is larger than the number of elements of said subgroup. That is, the group (N) is a nilpotent group.

Requirement 5. It requires that every element of a group (N), taken to the power of (q), equals to an identity element, wherein (q) is prime.

Requirement 6. It requires that an element of a group (N) is a point of abelian variety, and that the coordinate of said point is an element of a finite field.

Requirement 7. Under the requirement in the Requirement 6, if it further requires algebraic closure, a parent group (N) is an internal direct product of even numbers of cyclic subgroups.

Requirement 8. Under the requirement in the Requirement 7, if it further requires that the finite degree of a field extension is 1, the coordinate of both that of elements of a group (L) and that of all elements of a group (L') has the same finite degree of a field extension.

Eleventh Embodiment

In the embodiment, there is provided Requirements 1 to 23 as follows.

Requirement 1. A method of authentication between electronic devices, applicable in a first electronic device, a remote electronic device, and a mutual dynamic authentication, the method including:
  initiating, by the first electronic device, registration with the remote electronic device for registering an identity belonging to the first electronic device with the remote electronic device, by:
  calculating a second cryptographic authentication code (v2); and
  securing first information (w1) and second information (w2) from being tampered with by a middleman; wherein the first information (w1) is sent by the first electronic device to the remote electronic device, and the first information (w1) includes a first public key (A1) and a second public key (A2) of the first electronic device; and wherein the second information (w2) is received from the remote electronic device, and the second information (w2) includes a first public key (B1) and a second public key (B2) of the remote electronic device;
  wherein calculating a second cryptographic authentication code (v2) includes:
  calculating a cross-stage authentication code secret key (h) based on the second public key (B2) of the remote electronic device; and
  calculating a message authentication code as the second cryptographic authentication code (v2) by using the cross-stage authentication code secret key (h) as a message authentication code secret key and a first cryptographic authentication code (v1) as information to be authenticated;
  wherein securing first information (w1) and second information (w2) from being tampered with by a middleman includes:
  receiving the second information (w2), wherein the second information (w2) includes the first public key (B1) and the second public key (B2) of the remote electronic device;
  sending third information (w3), wherein the third information (w3) is sent by the first electronic device to the remote electronic device, and the third information (w3) includes the first cryptographic authentication code (v1) of the first electronic device, and wherein the first cryptographic authentication code (v1) is a one-way function of a cross-stage secret key (u) of the first electronic device;
  receiving fourth information (w4), wherein the fourth information (w4) is received from the remote electronic device; and
  sending fifth information (w5), wherein the fifth information (w5) is sent by the first electronic device to the remote electronic device, and the fifth information (w5) includes the second cryptographic authentication code (v2).

Requirement 2. A method of authentication between electronic devices, applicable in a first electronic device, a remote electronic device, and a mutual dynamic authentication, the method including:
  responding, by the remote electronic device, to the first electronic device for registering an identity belonging to the remote electronic device with the first electronic device, by:
  verifying that the first electronic device is in possession of a cross-stage secret key (u) of the first electronic device; and
  securing first information (w1) and second information (w2) from being tampered with by a middleman; wherein the first information (w1) is received by the remote electronic device from the first electronic device, and the first information (w1) includes a first public key (A1) and a second public key (A2) of the first electronic device; wherein the second information (w2) is sent by the remote electronic device to the first electronic device, and the second information (w2) includes a first public key (B1) and a second public key (B2) of the remote electronic device; and wherein a one-way function of a cross-stage secret key (y) that is calculated by using the second public key (A2) of the first electronic device, serves as the second public key (B2) of the remote electronic device;
  wherein verifying that the first electronic device is in possession of a cross-stage secret key (u) of the first electronic device includes:
  receiving the first information (w1), wherein the first information (w1) includes the first public key (A1) and the second public key (A2) of the first electronic device;
  sending the second information (w2), wherein the second information (w2) includes the first public key (B1) and the second public key (B2) of the remote electronic device;
  receiving third information (w3), wherein the third information (w3) is received by the remote electronic device from the first electronic device, and the third information (w3) includes a first cryptographic authentication code (v1) of the first electronic device; and wherein the first cryptographic authentication code (v1) is a one-way function of the cross-stage secret key (u) of the first electronic device; and verifying, by using the first cryptographic authentication code (v1), that the first electronic device is in possession of the cross-stage secret key (u) of the first electronic device;

wherein securing first information (w1) and second information (w2) from being tampered with by a middleman includes:

sending fourth information (w4), wherein the fourth information (w4) is sent by the remote electronic device to the first electronic device;

receiving fifth information (w5), wherein the fifth information (w5) is received by the remote electronic device from the first electronic device, and the fifth information (w5) includes a second cryptographic authentication code (v2) of the first electronic device; and storing information so that the first cryptographic authentication code (v1) related to the first electronic device, the second cryptographic authentication code (v2), and the cross-stage secret key (y) are retrievable across stages.

Requirement 3. A method of authentication between electronic devices, applicable in a first electronic device, a remote electronic device, and a mutual dynamic authentication, the method including:

initiating, by the first electronic device, mutual authentication between the first electronic device and the remote electronic device, by:

verifying that a second cryptographic authentication code (v2) is a message authentication code of a first cryptographic authentication code (v1); and securing first information (w1') and second information (w2') from being tampered with by a middleman; wherein the first information (w1') is sent by the first electronic device to the remote electronic device, and the first information (w1') includes a first public key (A1') and a second public key (A2') of the first electronic device; and wherein the second information (w2') is received by the first electronic device from the remote electronic device, and the second information (w2') includes a first public key (B1') of the remote electronic device;

wherein verifying that a second cryptographic authentication code (v2) is a message authentication code of a first cryptographic authentication code (v1) includes:

calculating a cross-stage authentication code secret key (h) based on a second public key (B2') of the remote electronic device; and calculating a message authentication code by using the cross-stage authentication code secret key (h) as a message authentication code secret key and the first cryptographic authentication code (v1) as information to be authenticated, and verifying that the message authentication code matches the second cryptographic authentication code (v2);

wherein securing first information (w1') and second information (w2') from being tampered with by a middleman includes:

receiving the second information (w2'), wherein the second information (w2') includes the first public key (B1') of the remote electronic device;

sending third information (w3'), wherein the third information (w3') is sent by the first electronic device to the remote electronic device, and the third information (w3') includes a proof that the first electronic device is in possession of a cross-stage secret key (u) of the first electronic device; and receiving fourth information (w4'), wherein the fourth information (w4') is received by the first electronic device from the remote electronic device, and the fourth information (w4') includes the second public key (B2') of the remote electronic device, and the second cryptographic authentication code (v2).

Requirement 4. A method of authentication between electronic devices, applicable in a first electronic device, a remote electronic device, and a mutual dynamic authentication, the method including:

responding, by the remote electronic device, to the first electronic device for mutual authentication between the first electronic device and the remote electronic device, by:

verifying that the first electronic device is in possession of a cross-stage secret key (u) of the first electronic device; and securing first information (w1') and second information (w2') from being tampered with by a middleman, wherein the first information (w1') is received by the remote electronic device from the first electronic device, and the first information (w1') includes a first public key (A1') and a second public key (A2') of the first electronic device; and wherein the second information (w2') is sent by the remote electronic device to the first electronic device, and the second information (w2') includes a first public key (B1') of the remote electronic device;

wherein verifying that the first electronic device is in possession of a cross-stage secret key (u) of the first electronic device includes:

using stored information, so that a first cryptographic authentication code (v1) related to the first electronic device, a second cryptographic authentication code (v2), and a cross-stage secret key (y) are retrieved, and receiving the first information (w1'), wherein the first information (w1') includes the first public key (A1') and the second public key (A2') of the first electronic device;

sending the second information (w2'), wherein the second information (w2') includes the first public key (B1') of the remote electronic device;

receiving third information (w3'), wherein the third information (w3') is received by the remote electronic device from the first electronic device, and the third information (w3') includes a proof that the first electronic device is in possession of the cross-stage secret key (u) of the first electronic device; and verifying, by using the first cryptographic authentication code (v1), that the first electronic device is in possession of the cross-stage secret key (u) of the first electronic device;

wherein securing first information (w1') and second information (w2') from being tampered with by a middleman includes:

sending fourth information (w4'), wherein the fourth information (w4') is sent by the remote electronic device to the first electronic device, and the fourth information includes a second public key (B2') of the remote electronic device, and the second cryptographic authentication code (v2); and wherein a one-way function of the cross-stage secret key (y) that is calculated by using the second public key (A2') of the first electronic device, serves as the second public key (B2') of the remote electronic device.

Requirement 5. The method of authentication between electronic devices according to Requirement 3 or Requirement 4, wherein the first public key (B1') of the remote electronic device is an element of a nilpotent group.

Requirement 6. A remote electronic device, including:
a memory configured to store secret key information;
a mutual dynamic authentication module (MDA) configured to verify that a first electronic device is in possession of a cross-stage secret key (u) of the first electronic device, and to secure first information (w1) and second information (w2) from being tampered with by a middleman, wherein the first information (w1) is received by the remote electronic device from the first electronic device, and the first information (w1) includes a first public key (A1) and a second public key (A2) of the first electronic device; wherein the second information (w2) is sent by the remote electronic device to the first electronic device, and the second information (w2) includes a first public key (B1) and a second public key (B2) of the remote electronic device; and wherein a one-way function of a cross-stage secret key (y) that is calculated by using the second public key (A2) of the first electronic device, serves as the second public key (B2) of the remote electronic device;
wherein verifying that the first electronic device is in possession of a cross-stage secret key (u) of the first electronic device includes:
receiving the first information (w1), wherein the first information (w1) includes the first public key (A1) and the second public key (A2) of the first electronic device;
sending the second information (w2), wherein the second information (w2) includes the first public key (B1) and the second public key (B2) of the remote electronic device;
receiving third information (w3), wherein the third information (w3) is received by the remote electronic device from the first electronic device, and the third information (w3) includes a first cryptographic authentication code (v1) of the first electronic device; and wherein the first cryptographic authentication code (v1) is a one-way function of the cross-stage secret key (u) of the first electronic device; and
verifying, by using the first cryptographic authentication code (v1), that the first electronic device is in possession of the cross-stage secret key (u) of the first electronic device;
wherein securing first information (w1) and second information (w2) from being tampered with by a middleman includes:
sending fourth information (w4), wherein the fourth information (w4) is sent by the remote electronic device to the first electronic device;
receiving fifth information (w5), wherein the fifth information (w5) is received by the remote electronic device from the first electronic device, and the fifth information (w5) includes a second cryptographic authentication code (v2) of the first electronic device; and
storing information so that the first cryptographic authentication code (v1) related to the first electronic device, the second cryptographic authentication code (v2), and the cross-stage secret key (y) are retrievable across stages.

Requirement 7. The remote electronic device according to Requirement 6, further including:

an authenticator configured to enable a verifier to determine that the authenticator is in possession of secret key information from an issuer of a group of trusted devices, and that the secret key information does not reveal any unique authentication information related to the remote electronic device; and
an authenticator specific module (ASM) configured to provide a standard communication interface of the authenticator;
wherein the mutual dynamic authentication module (MDA) is further configured to:
calculate a combined public key (D), wherein the combined public key (D)
includes a concatenation of the first public key (A1) of the first electronic device, the second public key (A2) of the first electronic device, and the first public key (B1) of the remote electronic device; and
to send the combined public key (D) to the authenticator specific module (ASM), and to receive a credential and a signature from the authenticator specific module (ASM), wherein the authenticator specific module (ASM) is a standard communication interface between the mutual dynamic authentication module (MDA) and the authenticator; wherein the credential attests to the verifier that a member public key (AKP) is a public key of a member belonging to the group of trusted devices; and the member public key (AKP) is a public key of an attestation key pair (AK); and the signature is generated by using a private key (AKS) and based on an inclusion of the combined public key (D); and the private key (AKS) is a private key of the attestation key pair (AK);
wherein the second information (w2) according to Requirement 6 further includes information ($S_B$) related to the signature of the remote electronic device, and the information ($S_B$) related to the signature of the remote electronic device includes the credential and the signature.

Requirement 8. The remote electronic device according to Requirement 7, wherein the mutual dynamic authentication module (MDA) is further configured to:
send an identifier (rpid) of a relying party (RP) to the authenticator specific module (ASM), and to receive the credential and the signature from the authenticator specific module (ASM), wherein the relying party (RP) is configured to authenticate the mutual dynamic authentication module (MDA), and wherein the signature is generated by using the secret key (AKS) and based on an inclusion of the identifier (rpid).

Requirement 9. The remote electronic device according to Requirement 6, wherein the mutual dynamic authentication module (MDA) is further configured to:
verify that the first electronic device is in possession of the cross-stage secret key (u) of the first electronic device, and to secure first information (w1') and second information (w2') from being tampered with by the middleman; wherein the first information (w1') is received by the remote electronic device from the first electronic device, and the first information (w1') includes a first public key (A1') and a second public key (A2') of the first electronic device; and wherein the second information (w2') is sent by the remote electronic device to the first electronic device, and the second information (w2') includes a first public key (B1') of the remote electronic device;
wherein verifying that the first electronic device is in possession of a cross-stage secret key (u) of the first electronic device includes:

using stored information, so that the first cryptographic authentication code (v1) related to the first electronic device, the second cryptographic authentication code (v2), and the cross-stage secret key (y) are retrieved, and receiving the first information (w1'), wherein the first information (w1') includes the first public key (A1') and the second public key (A2') of the first electronic device;

sending the second information (w2'), wherein the second information (w2') includes the first public key (B1') of the remote electronic device;

receiving third information (w3'), wherein the third information (w3') is received by the remote electronic device from the first electronic device, and the third information (w3) includes a proof that the first electronic device is in possession of the cross-stage secret key (u) of the first electronic device; and verifying, by using the first cryptographic authentication code (v1), that the first electronic device is in possession of the cross-stage secret key (u) of the first electronic device;

wherein securing first information (w1') and second information (w2') from being tampered with by a middleman includes:

sending fourth information (w4'), wherein the fourth information (w4') is sent by the remote electronic device to the first electronic device, and the fourth information (w4') includes a second public key (B2') of the remote electronic device, and the second cryptographic authentication code (v2), and wherein a one-way function of the cross-stage secret key (y) that is calculated by using the second public key (A2') of the first electronic device, serves as the second public key (B2') of the remote electronic device.

Requirement 10. The remote electronic device according to Requirement 9, wherein the first public key (B1') of the remote electronic device is an element of a nilpotent group.

Requirement 11. A first electronic device, including:
  a mutual dynamic authentication module (MDA) configured to calculate a second cryptographic authentication code (v2), and to secure first information (w1) and second information (w2) from being tampered with by a middleman; wherein the first information (w1) is sent by the first electronic device to the remote electronic device, and the first information (w1) includes a first public key (A1) and a second public key (A2) of the first electronic device; and wherein the second information (w2) is received from the remote electronic device, and the second information (w2) includes a first public key (B1) and a second public key (B2) of the remote electronic device;
  wherein calculating a second cryptographic authentication code (v2) including:
  calculating a cross-stage authentication code secret key (h) based on the second public key (B2) of the remote electronic device; and
  calculating a message authentication code as the second cryptographic authentication code (v2) by using the cross-stage authentication code secret key (h) as a message authentication code secret key and a first cryptographic authentication code (v1) as information to be authenticated;
  wherein securing first information (w1) and second information (w2) from being tampered with by a middleman includes:

receiving the second information (w2), wherein the second information (w2) includes the first public key (B1) and the second public key (B2) of the remote electronic device;

sending third information (w3), wherein the third information (w3) is sent by the first electronic device to the remote electronic device, and the third information (w3) includes the first cryptographic authentication code (v1) of the first electronic device, and wherein the first cryptographic authentication code (v1) is a one-way function of a cross-stage secret key (u) of the first electronic device;

receiving fourth information (w4), wherein the fourth information (w4) is received from the remote electronic device; and sending fifth information (w5), wherein the fifth information (w5) is sent by the first electronic device to the remote electronic device, and the fifth information (w5) includes the second cryptographic authentication code (v2).

Requirement 12. The first electronic device according to Requirement 11, further including:
  an authenticator configured to enable a verifier to determine that the authenticator is in possession of secret key information from an issuer of a group of trusted devices, and that the secret key information does not reveal any unique authentication information related to the first electronic device;
  an authenticator specific module (ASM) configured to provide a standard communication interface of the authenticator;
  wherein the mutual dynamic authentication module (MDA) further configured to:
  calculate a combined public key (D), wherein the combined public key (D) includes a concatenation of the first public key (A1) of the first electronic device, the second public key (A2) of the first electronic device, and the first public key (B1) of the remote electronic device; and
  to send the combined public key (D) to the authenticator specific module (ASM), and to receive a credential and a signature from the authenticator specific module (ASM), wherein the authenticator specific module (ASM) is a standard communication interface between the mutual dynamic authentication module (MDA) and the authenticator; wherein the credential attests to the verifier that a member public key (AKP) is a public key of a member belonging to the group of trusted devices, and the member public key (AKP) is a public key of an attestation key pair (AK); and the signature is generated by using a private key (AKS) and based on an inclusion of the combined public key (D); and the private key (AKS) is a private key of the attestation key pair (AK);
  wherein the third information (w3) according to Requirement 11 further includes information ($S_A$) related to the signature of the first electronic device, and the information ($S_A$) related to the signature of the first electronic device includes the credential and the signature.

Requirement 13. The first electronic device according to Requirement 12, wherein the mutual dynamic authentication module (MDA) is further configured to:
  send an identifier (rpid) of a relying party (RP) to the authenticator specific module (ASM), and to receive the credential and the signature from the authenticator specific module (ASM), wherein the relying party (RP) is configured to authenticate the mutual dynamic authentication module (MDA), and wherein the signature is generated by using the secret key (AKS) and based on an inclusion of the identifier (rpid).

Requirement 14. The first electronic device according to Requirement 11, wherein the mutual dynamic authentication module (MDA) is further configured to:
  verify that the second cryptographic authentication code (v2) is a message authentication code of a first cryptographic authentication code (v1), and to secure first information (w1') and second information (w2') from being tampered with by the middleman; wherein the first information (w1') is sent by the first electronic device to the remote electronic device, and the first information (w1') includes a first public key (A1') and a second public key (A2') of the first electronic device; and wherein the second information (w2') is received by the first electronic device from the remote electronic device, and the second information (w2') includes a first public key (B1') of the remote electronic device;
  wherein verifying that a second cryptographic authentication code (v2) is a message authentication code of a first cryptographic authentication code (v1) includes:
  calculating a cross-stage authentication code secret key (h) based on a second public key (B2') of the remote electronic device; and
  calculating a message authentication code by using the cross-stage authentication code secret key (h) as a message authentication code secret key and a first cryptographic authentication code (v1) as information to be authenticated, and verifying that the message authentication code matches the second cryptographic authentication code (v2);
  wherein securing first information (w1') and second information (w2') from being tampered with by a middleman includes:
  receiving the second information (w2'), wherein the second information (w2') includes the first public key (B1') of the remote electronic device;
  sending third information (w3'), wherein the third information (w3') is sent by the first electronic device to the remote electronic device, and the third information (w3') includes a proof that the first electronic device is in possession of a cross-stage secret key (u) of the first electronic device; and
  receiving fourth information (w4'), wherein the fourth information (w4') is received by the first electronic device from the remote electronic device, and the fourth information (w4') includes the second public key (B2') of the remote electronic device, and the second cryptographic authentication code (v2).

Requirement 15. The first electronic device according to Requirement 14, wherein the first public key (B1') of the remote electronic device is an element of a nilpotent group.

Requirement 16. A computer program, including instructions which, cause the remote electronic device according to Requirement 6 to execute the steps of the method according to Requirement 2.

Requirement 17. A computer readable medium having stored thereon the computer program according to Requirement 16.

Requirement 18. A computer program including instructions which, cause the first electronic device according to Requirement 11 to execute the steps of the method according to Requirement 1.

Requirement 19. A computer readable medium having stored thereon the computer program according to Requirement 18.

Requirement 20. A mutual dynamic authentication module (MDA), configured to verify that a first electronic device is in possession of a cross-stage secret key (u) of the first electronic device, and to secure first information (w1') and second information (w2') from being tampered with by a middleman; wherein the first information (w1') is received from the first electronic device, and the first information (w1') includes a first public key (A1') and a second public key (A2') of the first electronic device; and wherein the second information (w2') is sent to the first electronic device, and the second information (w2') includes a first public key (B1') of a remote electronic device;
  wherein verifying that the first electronic device is in possession of a cross-stage secret key (u) of the first electronic device includes:
  using stored information, so that a first cryptographic authentication code (v1) related to the first electronic device, a second cryptographic authentication code (v2), and a cross-stage secret key (y) are retrieved, and receiving the first information (w1'), wherein the first information (w1') includes the first public key (A1') and the second public key (A2') of the first electronic device;
  sending the second information (w2'), wherein the second information (w2') includes the first public key (B1') of the remote electronic device;
  receiving third information (w3'), wherein the third information (w3') is received from the first electronic device, and the third information (w3') includes a proof that the first electronic device is in possession of the cross-stage secret key (u) of the first electronic device; and
  verifying, by using the first cryptographic authentication code (v1), that the first electronic device is in possession of the cross-stage secret key (u) of the first electronic device;
  wherein securing first information (w1') and second information (w2') from being tampered with by a middleman includes:
  sending fourth information (w4'), wherein the fourth information (w4') is sent to the first electronic device, and the fourth information includes a second public key (B2') of the remote electronic device, and the second cryptographic authentication code (v2); and wherein a one-way function of the cross-stage secret key (y) that is calculated by using the second public key (A2') of the first electronic device, serves as the second public key (B2') of the remote electronic device.

Requirement 21. The mutual dynamic authentication module (MDA) according to Requirement 20, wherein the first public key (B1') of the remote electronic device is an element of a nilpotent group.

Requirement 22. A mutual dynamic authentication module (MDA) configured to verify that a second cryptographic authentication code (v2) is a message authentication code of a first cryptographic authentication code (v1), and to secure first information (w1') and second information (w2') from being tampered with by a middleman; wherein the first information (w1') is sent to a remote electronic device, and the first information (w1') includes a first public key (A1') and a second public key (A2') of a first electronic device; and wherein the second information (w2') is received from the remote electronic device, and the second information (w2') includes a first public key (B1') of the remote electronic device;

wherein verifying that a second cryptographic authentication code (v2) is a message authentication code of a first cryptographic authentication code (v1) includes:

calculating a cross-stage authentication code secret key (h) based on a second public key (B2') of the remote electronic device; and calculating a message authentication code by using the cross-stage authentication code secret key (h) as a message authentication code secret key and the first cryptographic authentication code (v1) as information to be authenticated, and verifying that the message authentication code matches the second cryptographic authentication code (v2);

wherein securing first information (w1') and second information (w2') from being tampered with by a middle-man includes:

receiving the second information (w2'), wherein the second information (w2') includes the first public key (B1') of the remote electronic device;

sending third information (w3'), wherein the third information (w3') is sent to the remote electronic device, and the third information (w3') includes a proof that the first electronic device is in possession of a cross-stage secret key (u) of the first electronic device; and receiving fourth information (w4'), wherein the fourth information (w4') is received from the remote electronic device, and the fourth information (w4') includes the second public key (B2') of the remote electronic device, and the second cryptographic authentication code (v2).

Requirement 23. The mutual dynamic authentication module (MDA) according to Requirement 22, wherein the first public key (B1') of the remote electronic device is an element of a nilpotent group.

CONCLUSION

The above disclosed content is merely preferred feasible embodiments of the disclosure. It is not therefore intended to limit the claims of the disclosure. Therefore, all equivalent technical changes made using the descriptions and drawings are included in the claims of the disclosure.

The following table 1 explicates terms in the disclosure.

TABLE 1

| Term/Symbol | Descriptions/Explications |
|---|---|
| include/comprise | include(s), but not limited to, what is described. |
| a mutual dynamic authentication | used by a first electronic device to initiate a registration with a remote electronic device, for registering an identity belonging to the first electronic device with the remote electronic device; used by a remote electronic device to respond to a first electronic device initiating a registration with the remote electronic device, for registering an identity belonging to the remote electronic device with the first electronic device; used by a first electronic device to initiate in a mutual authentication between a first electronic device and a remote electronic device, for attesting to the remote electronic device an identity belonging to the first electronic device, and authenticating an identity of the remote electronic device; used by a remote electronic device to respond to a first electronic device initiating a mutual authentication between the first electronic device and the remote electronic device, for attesting to the first electronic device an identity belonging to the remote electronic device, and authenticating an identity belonging to the first electronic device. |
| a registration stage | the stage of initiating a registration and responding to the registration. |
| an authentication stage | the stage of initiating a mutual authentication and responding to the mutual authentication. |
| a dynamic authentication | different identities may be selected for registration in a first registration stage and a second registration stage. |
| MDA | a module configured to perform mutual dynamic authentication. implementations of MDA include hardware electronic circuits, or digital logic chips, or firmware, or software, or browser, or script of browser, etc. |
| $MDA_A$ | MDA of a first electronic device. |
| $MDA_B$ | MDA of a remote electronic device. |
| ASM | authenticator specific module. |
| $ASM_A$ | ASM of a first electronic device. |
| $ASM_B$ | ASM of a remote electronic device. |
| a first electronic device, a remote electronic device | an initiator is a first electronic device and a responder is a remote electronic device. implementations of a first electronic device and a remote electronic device may include a computer, or a personal computer, or a mobile phone, or a tablet computer, or a device, or a transmitter, or a receiver, or a processor, or a storage, or a memory, or a chip, or a chipset, or a semiconductor component, etc. |
| a message authentication code | a kind of information for authenticating information. |
| $MAC_m$ | a function of generating a message authentication code. Subscript (m) denotes that a message authentication code secret key used by the function of generating the message authentication code is (m). |
| credential | a credential is a certificate of a public key, including a public key per se, or a self-signed certificate, or a chain of certificates. |

TABLE 1-continued

| Term/Symbol | Descriptions/Explications |
| --- | --- |
| an anonymous credential | an anonymous credential authority issues an anonymous credential, which attests that said public key belongs to a member of a group of trusted devices and does not reveal any unique authentication information related to said device. |
| a DAA group credential | a unique credential of a group of devices is used for asserting to a verifier that an authenticator is in possession of uncompromised secret key information from an issuer of a group of trusted devices. A DAA group credential does not reveal any unique authentication information related to said authenticator. |
| a common session secret key | a mutually established secret key using key exchange. |
| a secure channel | information transmitted in a secure channel is encrypted by a common session secret key and its message is authenticated. |
| a session | a communication in a secure channel. After first key exchange, a first session is established. After second key exchange, a second session is established. |
| cross stage(s) | a first session and a second session have the same number/value. |
| temporary | generated temporarily. |
| specific to | a description of a correspondence. "(a) specific to (b)" denotes a correspondence between (a) and (b). |
| anonymous | a device is a member of a group of devices. |
| middleman | a third party with a possibility to get or tamper information. |
| group of trusted devices | an issuer issues that a device is a member belongs to a group of trusted devices. |
| verifier | a device provides the verification in response to a request for authentication of an identity from another device. |
| issuer | a third party organizes and manages a group of trusted devices. a device manufacturer is any entity which manfactures or configures a platform or a device (such as TPM). In an embodiment, an issuer is a device manufacturer. |
| RP | a relying party authenticates MDA. |
| rpid | an identifier of RP. |
| authenticator | a device or an entity includes verification logics, or cryptographic functions. In an embodiment, an authenticator is a TPM. |
| TPM | Trusted Platform Module. |
| DAA | technology of direct anonymous attestation. |
| DAA signature | using a secret key of a member to provide a unique signature secret key. a signature secret key based on DAA, such a unique signature secret key is used to generate a unique signature, i.e., a DAA signature, and to attest to a varifier that a device is a member of a group of trusted devices. It does not reveal said unique authentication information, wherein, said unique signature is using the technology of DAA. |
| DAA-Sign$_C$ | a function of generating a DAA signature of a first electronic device. |
| DAA-Sign$_S$ | a function of generating a DAA signature of a first electronic device. |
| Sign$_B$ | a function of generating a signature of a remote electronic device. |
| Sign$_A$ | a function of generating a signature of a first electronic device. |
| Cert$_B$ | an anonymous credential or a self-signed credential of a remote electronic device. |
| Cert$_A$ | an anonymous credential or a self-signed credential of a first electronic device. |
| Cert$_C$ | a DAA group credential of a first electronic device. |
| Cert$_S$ | a DAA group credential of a remote elctronic device. |
| AK | an attestation key pair. |
| AKP | a public key of AK. |
| AKS | a private key of AK. |
| AK$_B$ | an attestation key pair of a remote electronic device. |
| AKP$_B$ | a public key of AK of a remote electronic device. |
| AKS$_B$ | a private key of AK of a remote electronic device. |
| AK$_A$ | an attestation key pair of a first electronic device. |
| AKP$_A$ | a public key of AK of a first electronic device. |
| AKS$_A$ | a private key of AK of a first electronic device. |
| PRF | a pseudo random function. |
| KDF | a key derivation function. |
| secure salt | a "salt" in cryptography is encrypted to become an encrypted salt, which is called a secure salt, and the method of adding a string to a one-way function is called salting. |

TABLE 1-continued

| Term/Symbol | Descriptions/Explications |
| --- | --- |
| default function | a pre-shared function between a first electronic device and a remote electronic device. |
| preset number/value | a pre-shared number/value between a first electronic device and a remote electronic device. |
| i | an identity. |
| p | a password. In an embodiment, a password is obtained from the outside of MDA. |
| i' | an identifier. (i) and (i') may be the same. |
| x | an element password. |
| u | a cross-stage secret key of a first electronic device. |
| h | a cross stage secret key of a first electronic device. |
| ‖ | a concatenation, or a default function. |
| H1 | a default function, or a one-way function. |
| H2 | a default function, or a one-way function. |
| H3 | a default function, or a one-way function. |
| H4 | a default function, or a one-way function. |
| D | a combined public key, which may be generated in a registration stage. |
| D' | a combined public key, which may be generated in an authentication stage. |
| x1 | a first concatenation, which may be generated in a registration stage. |
| x2 | a second concatenation, which may in a registration stage. |
| x1' | a first concatenation, which may in an authentication stage. |
| x2' | a second concatenation, which may in an authentication stage. |
| Z | a one-way function mapping to (G). |
| v1 | a first cryptographic authentication code. |
| v2 | a second cryptographic authentication code. |
| L | a group. |
| × | a operator of (L). |
| G | (G) is a set of all but an identity element of a group (L). |
| g | (g) is a generator of (L). |
| q | (q) is the number of elements of (L) and prime. |
| power notation | the power of an exponent with respect to (×). |
| y | a cross-stage secret key of a remote electronic device. |
| o | a cross-stage secret key of a remote electronic device. |
| a | a random integer number/value of a first electronic device, which is a temporary private key in a registration stage. |
| r | a random integer number/value of a first electronic device, which is a temporary private key in a registration stage. |
| a' | a random integer number/value of a first electronic device, which is a temporary private key in an authentication stage. |
| r' | a random integer number/value of a first electronic device, which is a temporary private key in an authentication stage. |
| A1 | a first public key of a first electronic device, which may be generated in a registration stage. |
| A2 | a second public key of a first electronic device, which may be generated in a registration stage. |
| A1' | a first public key of a first electronic device, which may be generated in an authentication stage. |
| A2' | a second public key of a first electronic device, which may be generated in an authentication stage. |
| b | a temporary private key of a remote electronic device, which may be generated in a registration stage. |
| b' | a temporary private key of a remote electronic device, which may be generated in an authentication stage. |
| B1 | a first public key of a remote electronic device, which may be generated in a registration stage. |
| B2 | a second public key of a remote electronic device, which may be generated in a registration stage |
| B3 | a third public key of a remote electronic device, which may be generated in a registration stage. |
| B1' | a first public key of a remote electronic device, which may be generated in an authentication stage. |
| B2' | a second public key of a remote electronic device, which may be generated in an authentication stage. |
| B3' | a third public key of a remote electronic device, which may be generated in an authentication stage. |
| d | a common integer number/value, which may be generated in a registration stage. |
| d' | a common integer number/value, which may be generated in an authentication stage. |
| w1 | first information which may be generated in a registration stage. |
| w2 | second information which may be generated in a registration stage. |
| w3 | third information which may be generated in a registration stage. |
| w4 | fourth information which may be generated in a registration stage. |
| w5 | fifth information which may be generated in a registration stage. |
| w1' | first information which may be generated in an authentication stage. |

TABLE 1-continued

| Term/Symbol | Descriptions/Explications |
|---|---|
| w2' | second information which may be generated in an authentication stage. |
| w3' | third information which may be generated in an authentication stage. |
| w4' | fourth information which may be generated in an authentication stage. |
| M1 | a first message authentication code, which may be generated in a registration stage. |
| M2 | a second message authentication code, which may be generated in a registration stage. |
| M3 | a third message authentication code, which may be generated in a registration stage. |
| M1' | a first message authentication code, which may be generated in an authentication stage. |
| M2' | a second message authentication code, which may be generated in an authentication stage. |
| e | a common secret key which may be generated in a registration stage. |
| e' | a common secret key, which may be generated in an authentication stage. |
| k1 | a common session secret key, which may be generated in a registration stage and in a first electronic device's possession. |
| k2 | a common session secret key, which may be generated in a registration stage and in a remote electronic device's possession. |
| k1' | a common session secret key, which may be generated in an authentication stage and in a first electronic device's possession. |
| k2' | a common session secret key, which may be generated in an authentication stage and in a remote electronic device's possession. |
| m1 | a message authentication code secret code, which may be generated in a registration stage and in a first electronic device's possession. |
| m2 | a message authentication code secret code, which may be generated in a registration stage and in a remote electronic device's possession. |
| m1' | a message authentication code secret key, which may be generated in an authentication stage and in a first electronic device's possession. |
| m2' | a message authentication code secret key, which may be generated in an authentication stage and in a remote electronic device's possession. |
| $S_B$ | information related to a signature of a remote electronic device, which may be generated in a registration stage. |
| $S_A$ | information related to a signature of a first electronic device, which may be generated in a registration stage. |
| $S_B'$ | information related to a signature of a remote electronic device, which may be generated in an authentication stage. |
| $S_A'$ | information related to a signature of a first electronic device, which may be generated in an authentication stage. |
| $S_C$ | a signature generated by using a cross-stage secret key (u) of a first electronic device based on an inclusion of (rpid), which may be generated in a registration stage. |
| $S_C'$ | a signature generated by using a cross-stage secret key (u) of a first electronic device based on an inclusion of (rpid), which may be generated in an authentication stage. |

What is claimed is:

1. A method of authentication between electronic devices, applicable in a first electronic device, a remote electronic device, and a mutual dynamic authentication, the method comprising:

initiating, by the first electronic device, registration with the remote electronic device for registering an identity belonging to the first electronic device with the remote electronic device, by:

calculating a second cryptographic authentication code (v2); and securing first information (w1) and second information (w2) from being tampered with by a middleman; wherein the first information (w1) is sent by the first electronic device to the remote electronic device, and the first information (w1) comprises a first public key (A1) and a second public key (A2) of the first electronic device; and wherein the second information (w2) is received from the remote electronic device, and the second information (w2) comprises a first public key (B1) and a second public key (B2) of the remote electronic device;

wherein calculating a second cryptographic authentication code (v2) comprises:

calculating a cross-stage authentication code secret key (h) based on the second public key (B2) of the remote electronic device; and calculating a message authentication code as the second cryptographic authentication code (v2) by using the cross-stage authentication code secret key (h) as a message authentication code secret key and a first cryptographic authentication code (v1) as information to be authenticated;

wherein securing first information (w1) and second information (w2) from being tampered with by a middleman comprises:

receiving the second information (w2), wherein the second information (w2) comprises the first public key (B1) and the second public key (B2) of the remote electronic device;

sending third information (w3), wherein the third information (w3) is sent by the first electronic device to the remote electronic device, and the third information (w3) comprises the first cryptographic authentication code (v1) of the first electronic device, and wherein the first cryptographic authentication code (v1) is a one-way function of a cross-stage secret key (u) of the first electronic device;

receiving fourth information (w4), wherein the fourth information (w4) is received from the remote electronic device; and sending fifth information (w5), wherein the fifth information (w5) is sent by the first electronic device to the remote electronic device, and the fifth information (w5) comprises the second cryptographic authentication code (v2);

wherein the remote electronic device verifies that the cross-stage secret key (u) is in possession of the first electronic device when responding to the first electronic device and registering an identity belonging to the remote electronic device with the first electronic device, and that the cross-stage secret key (u) is in the possession of the first electronic device when mutual authentication is performed between the first electronic device and the remote electronic device;

wherein a one-way function of a cross-stage secret key (y) that is calculated by using the second public key (A2) of the first electronic device, serves as the second public key (B2) of the remote electronic device;

wherein $A2=x^r$, A2 is the second public key (A2) of the first electronic device, x is an element password (x), and r is a private key of the first electronic device; wherein $t=x^y$, t is a secure salt (t), and y is the cross-stage secret key (y); and wherein the cross-stage secret key (u) of the first electronic device is calculated by the first electronic device based on the element password (x), an identity (i) of the first electronic device, and the secure salt (t).

2. The method of authentication of claim 1, wherein the cross-stage secret key (u) of the first electronic device is stored in a memory of the first electronic device.

3. The method of authentication of claim 1, wherein the cross-stage secret key (u) of the first electronic device is retrieved from a memory of the first electronic device.

4. The method of authentication of claim 1, wherein the cross-stage secret key (u) of the first electronic device is calculated based on an element password (x), a secure salt (t), and an identity (i) of the first electronic device.

5. A method of authentication between electronic devices, applicable in a first electronic device, a remote electronic device, and a mutual dynamic authentication, the method comprising:

responding, by the remote electronic device, to the first electronic device for registering an identity belonging to the remote electronic device with the first electronic device, by:

verifying that the first electronic device is in possession of a cross-stage secret key (u) of the first electronic device; and securing first information (w1) and second information (w2) from being tampered with by a middleman; wherein the first information (w1) is received by the remote electronic device from the first electronic device, and the first information (w1) comprises a first public key (A1) and a second public key (A2) of the first electronic device; wherein the second information (w2) is sent by the remote electronic device to the first electronic device, and the second information (w2) comprises a first public key (B1) and a second public key (B2) of the remote electronic device; and wherein a one-way function of a cross-stage secret key (y) that is calculated by using the second public key (A2) of the first electronic device, serves as the second public key (B2) of the remote electronic device;

wherein verifying that the first electronic device is in possession of the cross-stage secret key (u) of the first electronic device comprises:

receiving the first information (w1), wherein the first information (w1) comprises the first public key (A1) and the second public key (A2) of the first electronic device;

sending the second information (w2), wherein the second information (w2) comprises the first public key (B1) and the second public key (B2) of the remote electronic device;

receiving third information (w3), wherein the third information (w3) is received by the remote electronic device from the first electronic device, and the third information (w3) comprises a first cryptographic authentication code (v1) of the first electronic device; and wherein the first cryptographic authentication code (v1) is a one-way function of the cross-stage secret key (u) of the first electronic device; and verifying, by using the first cryptographic authentication code (v1), that the first electronic device is in possession of the cross-stage secret key (u) of the first electronic device;

wherein securing first information (w1) and second information (w2) from being tampered with by a middleman comprises:

sending fourth information (w4), wherein the fourth information (w4) is sent by the remote electronic device to the first electronic device;

receiving fifth information (w5), wherein the fifth information (w5) is received by the remote electronic device from the first electronic device, and the fifth information (w5) comprises a second cryptographic authentication code (v2) of the first electronic device; and storing information so that the first cryptographic authentication code (v1) related to the first electronic device, the second cryptographic authentication code (v2), and the cross-stage secret key (y) are retrievable across stages;

wherein the remote electronic device verifies that the cross-stage secret key (u) is in the first electronic device's possession when responding to the first electronic device and registering an identity belonging to the remote electronic device with the first electronic device, and that the cross-stage secret key (u) is in the first electronic device's possession when mutual authentication is performed between the first electronic device and the remote electronic device;

wherein $A2=x^r$, A2 is the second public key (A2) of the first electronic device, x is an element password (x), and r is a private key of the first electronic device; wherein $t=x^y$, t is a secure salt (t), and y is the cross-stage secret key (y); and wherein the cross-stage secret key (u) of the first electronic device is calculated by the first electronic device based on the element password (x), an identity (i) of the first electronic device, and the secure salt (t).

6. The method of authentication of claim 5, wherein the cross-stage secret key (y) is generated randomly.

7. The method of authentication of claim 5, wherein the cross-stage secret key (y) is calculated based on an identifier (i') of the first electronic device.

8. A method of authentication between electronic devices, applicable in a first electronic device, a remote electronic device, and a mutual dynamic authentication, the method comprising:
   initiating, by the first electronic device, mutual authentication between the first electronic device and the remote electronic device, by:
   verifying that a second cryptographic authentication code (v2) is a message authentication code of a first cryptographic authentication code (v1); and
   securing first information (w1') and second information (w2') from being tampered with by a middleman; wherein the first information (w1') is sent by the first electronic device to the remote electronic device, and the first information (w1') comprises a first public key (A1') and a second public key (A2') of the first electronic device; and wherein the second information (w2') is received by the first electronic device from the remote electronic device, and the second information (w2') comprises a first public key (B1') of the remote electronic device;
   wherein verifying that a second cryptographic authentication code (v2) is a message authentication code of a first cryptographic authentication code (v1) comprises:
      calculating a cross-stage authentication code secret key (h) based on a second public key (B2') of the remote electronic device; and
      calculating a message authentication code by using the cross-stage authentication code secret key (h) as a message authentication code secret key and the first cryptographic authentication code (v1) as information to be authenticated, and verifying that the message authentication code matches the second cryptographic authentication code (v2);
   wherein securing first information (w1') and second information (w2') from being tampered with by a middleman comprises:
      receiving the second information (w2'), wherein the second information (w2') comprises the first public key (B1') of the remote electronic device;
      sending third information (w3'), wherein the third information (w3') is sent by the first electronic device to the remote electronic device, and the third information (w3') comprises a proof that the first electronic device is in possession of a cross-stage secret key (u) of the first electronic device; and
      receiving fourth information (w4'), wherein the fourth information (w4') is received by the first electronic device from the remote electronic device, and the fourth information (w4') comprises the second public key (B2') of the remote electronic device, and the second cryptographic authentication code (v2);
   wherein the remote electronic device verifies that the cross-stage secret key (u) is in the first electronic device's possession when responding to the first electronic device and registering an identity belonging to the remote electronic device with the first electronic device, and that the cross-stage secret key (u) is in the first electronic device's possession when mutual authentication is performed between the first electronic device and the remote electronic device;
   wherein the first public key (B1') of the remote electronic device is a point of an abelian variety;
   wherein $B1'=g^{b'} \times g'^{v1}$, B1' is the first public key (B1') of the remote electronic device, g is a generator of a group (L), g' is a generator of a group (L'), b' is a private key (b') of the remote electronic device, and v1 is the first cryptographic authentication code (v1); and wherein the group (L) and the group (L') a re not common; and
   wherein all coordinates of all points of the group (L) are defined over a field whose finite degree of a field extension is one; and all coordinates of all points of the group (L') are defined over a field whose finite degree of a field extension is one.

9. The method of authentication of claim 8, wherein the cross-stage secret key (u) of the first electronic device is stored in a memory of the first electronic device.

10. The method of authentication of claim 8, wherein the cross-stage secret key (u) of the first electronic device is retrieved from a memory of the first electronic device.

11. The method of authentication of claim 8, wherein the cross-stage secret key (u) of the first electronic device is calculated based on an element password (x), a secure salt (t), and an identity (i) of the first electronic device.

12. The method of authentication of claim 8, wherein $B1'=g^{b'} \times g'^{v1}$, B1' is the first public key (B1') of the remote electronic device, g is a generator of a group (L), g' is a generator of a group (L'), b' is a private key (b') of the remote electronic device, and v1 is the first cryptographic authentication code (v1); and wherein the group (L) and the group (L') are not common.

13. A method of authentication between electronic devices, applicable in a first electronic device, a remote electronic device, and a mutual dynamic authentication, the method comprising:
   responding, by the remote electronic device, to the first electronic device for mutual authentication between the first electronic device and the remote electronic device, by:
   verifying that the first electronic device is in possession of a cross-stage secret key (u) of the first electronic device; and
   securing first information (w1') and second information (w2') from being tampered with by a middleman, wherein the first information (w1') is received by the remote electronic device from the first electronic device, and the first information (w1') comprises a first public key (A1') and a second public key (A2') of the first electronic device; and wherein the second information (w2') is sent by the remote electronic device to the first electronic device, and the second information (w2') comprises a first public key (B1') of the remote electronic device;
   wherein verifying that the first electronic device is in possession of a cross-stage secret key (u) of the first electronic device comprises:
      using stored information, so that a first cryptographic authentication code (v1) related to the first electronic device, a second cryptographic authentication code (v2), and a cross-stage secret key (y) are retrieved, and receiving the first information (w1'), wherein the first information (w1') comprises the first public key (A1') and the second public key (A2') of the first electronic device;

sending the second information (w2'), wherein the second information (w2') comprises the first public key (B1') of the remote electronic device;

receiving third information (w3'), wherein the third information (w3') is received by the remote electronic device from the first electronic device, and the third information (w3') comprises a proof that the first electronic device is in possession of the cross-stage secret key (u) of the first electronic device; and verifying, by using the first cryptographic authentication code (v1), that the first electronic device is in possession of the cross-stage secret key (u) of the first electronic device;

wherein securing first information (w1') and second information (w2') from being tampered with by a middleman comprises:

sending fourth information (w4'), wherein the fourth information (w4') is sent by the remote electronic device to the first electronic device, and the fourth information comprises a second public key (B2') of the remote electronic device, and the second cryptographic authentication code (v2); and wherein a one-way function of the cross-stage secret key (y) that is calculated by using the second public key (A2') of the first electronic device, serves as the second public key (B2') of the remote electronic device;

wherein the remote electronic device verifies that the cross-stage secret key (u) is in the first electronic device's possession when responding to the first electronic device and registering an identity belonging to the remote electronic device with the first electronic device, and that the cross-stage secret key (u) is in the first electronic device's possession when mutual authentication is performed between the first electronic device and the remote electronic device;

wherein $A2'=x^{r'}$, A2' is the second public key (A2') of the first electronic device, x is an element password (x), and r' is a private key of the first electronic device; and wherein $t=x^y$, t is a secure salt (t), and y is the cross-stage secret key (y); and wherein the cross-stage secret key (u) of the first electronic device is calculated by the first electronic device based on the element password (x), an identity (i) of the first electronic device, and the secure salt (t).

14. The method of authentication of claim 13, wherein the cross-stage secret key (y) is generated randomly.

15. The method of authentication of claim 13, wherein the cross-stage secret key (y) is calculated based on an identifier (i') of the first electronic device.

16. The method of authentication of claim 13, wherein $B1'=g^{b'} \times g'^{v1}$, B1' is the first public key (B1') of the remote electronic device, g is a generator of a group (L), g' is a generator of a group (L'), b' is a private key (b') of the remote electronic device, and v1 is the first cryptographic authentication code (v1); and wherein the group (L) and the group (L') are not common.

17. The method of authentication of claim 13, wherein the first public key (B1') of the remote electronic device is a point of an abelian variety;

wherein $B1'=g^{b'} \times g'^{v1}$, B1' is the first public key (B1') of the remote electronic device, g is a generator of a group (L), g' is a generator of a group (L'), b' is a private key (b') of the remote electronic device, and v1 is the first cryptographic authentication code (v1); and wherein the group (L) and the group (L') are not common; and wherein all coordinates of all points of the group (L) are defined over a field whose finite degree of a field extension is one; and all coordinates of all points of the group (L') are defined over a field whose finite degree of a field extension is one.

* * * * *